United States Patent [19]

Kurahashi et al.

[11] Patent Number: 5,529,139
[45] Date of Patent: Jun. 25, 1996

[54] VEHICLE SPEED CONTROL SYSTEM

[75] Inventors: Akira Kurahashi, Aichi-ken; Katsuhiko Hibino, Toyoake; Mamoru Shimamoto, Nagoya; Mitsufumi Hashimoto, Shizuoka-ken, all of Japan

[73] Assignee: Nippondenso Co., Ltd., Japan

[21] Appl. No.: 204,572

[22] Filed: Mar. 2, 1994

[30] Foreign Application Priority Data

Mar. 3, 1993 [JP] Japan ................................. 5-042785

[51] Int. Cl.⁶ .................................................. B60K 31/08
[52] U.S. Cl. ......................... 180/169; 318/587; 340/903; 364/426.04
[58] Field of Search ................................... 180/167, 169, 180/170; 364/426.04, 426.01; 340/903; 318/587

[56] References Cited

U.S. PATENT DOCUMENTS

| | | | |
|---|---|---|---|
| 4,621,705 | 11/1985 | Etoh | 180/169 |
| 4,628,317 | 12/1986 | Nishikawa et al. | 180/169 |
| 5,014,200 | 5/1991 | Chundrlik et al. | 180/167 |
| 5,177,462 | 1/1993 | Kajiwara | 180/167 |
| 5,197,562 | 3/1993 | Kakinami et al. | 180/169 |
| 5,227,784 | 7/1993 | Masamori et al. | 180/167 |
| 5,230,400 | 7/1993 | Kakinami et al. | 180/169 |
| 5,234,071 | 8/1993 | Kajiwara | 180/169 |

FOREIGN PATENT DOCUMENTS

| | | |
|---|---|---|
| 60-121130 | 6/1985 | Japan . |
| 60-215432 | 10/1985 | Japan . |
| 61-150835 | 7/1986 | Japan . |

*Primary Examiner*—Margaret A. Focarino
*Assistant Examiner*—Michael Mar
*Attorney, Agent, or Firm*—Cushman Darby & Cushman

[57] ABSTRACT

A vehicle speed control system for controlling the speed of a controlled vehicle to follow a preceding vehicle detected at a constant interval is provided. In this system, when a preceding vehicle traveling ahead of the controlled vehicle is detected, it is checked if the preceding vehicle detected meets a given tracking condition. When the tracking condition is encountered, it is reported to a driver. The system is responsive to a manual operation of the driver after the driver has perceived that the preceding vehicle can be tracked to initiate constant inter-vehicle distance control.

17 Claims, 21 Drawing Sheets

LINE A : $DIS = 100 - \frac{3}{2} \cdot VRR^2 - 2 \cdot VRR$

LINE B : $DIS = \max\left(\frac{VRR^2}{0.6} + 20, \ 2 \cdot \frac{VRR^2}{0.6}\right)$ LINE C : $DIS = 18 + \frac{VRR^2}{1.2}$ DIS : INTERVAL TO VEHICLE IDENTIFIED (m)
VRR : RELATIVE SPEED TO VEHICLE IDENTIFIED (m/s)

MDV : BASIC CHANGE RATE OF SPEED (UNIT km/h/sec)

| RELATIVE SPEED (km/h) | CURRENT DISTANCE –TARGET DISTANCE (m) | -32 | -16 | 0 | 16 | 32 | 48 | 64 |
|---|---|---|---|---|---|---|---|---|
| CLOSER | -24 | -12 | -12 | -10 | -9 | -9 | -9 | -9 |
| | -16 | -12 | -12 | -10 | -9 | -9 | -9 | -9 |
| | -8 | -12 | -5.5 | -3 | -0.8 | 0 | 0 | 0 |
| CONSTANT | 0 | -10 | -2.5 | 0 | 2.0 | 2.0 | 2.0 | 2.0 |
| AWAY | 8 | -2.0 | 2.0 | 3.0 | 4.2 | 4.2 | 4.2 | 4.2 |
| | 16 | 0 | 3.5 | 5.0 | 6.2 | 6.2 | 6.2 | 6.2 |

VALUE BEYOND ABOVE REGION IS DETERMINED USING INTERPOLATION

DECELERATION    ACCELERATION a : TRAVELING CONTROL AT TARGET SPEED
b : THROTTLE FULLY CLOSED
c : THROTTLE FULLY CLOSED + OD RELEASE
d : HYSTERESIS

VEHICLE SPEED CONTROL SYSTEM

BACKGROUND OF THE INVENTION

1. Technical Field of the Invention

The present invention relates generally to vehicle speed control systems, and more particularly to a vehicle speed control system which, in response to a manual operation of a driver, automatically controls the speed of a vehicle such that it follows a preceding vehicle at a constant interval.

2. Background Art

Japanese Patent First Publication No. 60-121130 discloses a vehicle speed control system capable of modifying an inter-vehicle distance from a preceding vehicle detected using a radar unit, for example. This conventional vehicle speed control system maintains a current vehicle speed even when the detected preceding vehicle has disappeared. In addition, another system known in the art is capable of accelerating a controlled vehicle to a set speed value when the system has lost a detected preceding vehicle.

The drawback of such a prior art vehicle speed control system is that when a preceding vehicle is traveling at a slow speed in a front detection area and the system cannot detect it for any reason, such as a failed preceding vehicle detecting sensor, for example the speed of the controlled vehicle is undesirably brought under cruise control independent of constant inter-vehicle distance control.

SUMMARY OF THE INVENTION

It is therefore a principal object of the present invention to avoid tile disadvantages of the prior art.

It is another object of the present invention to provide a vehicle speed control system which is designed to maintain a constant following distance between a controlled vehicle and a detected preceding vehicle after a driver of the controlled vehicle perceives the presence of the detected preceding vehicle.

It is a further object of the invention to provide an improved vehicle speed control system which maintains a constant inter-vehicle distance from a detected preceding vehicle under preselected conditions even when the preceding vehicle has moved out of detection range.

According to one aspect of the present invention, there is shown a vehicle speed control system which comprises a preceding vehicle detecting means for detecting the presence of a preceding vehicle ahead of the vehicle controlled by this system and for providing a signal indicative thereof, a preceding vehicle identifying means which responds to the signal from preceding vehicle detecting means and identifies whether the detected preceding vehicle meets a preselected tracking condition for allowing the controlled vehicle to track the detected preceding vehicle and provides a signal indicative thereof, an informing means which responds to the signal from the preceding vehicle identifying means and provides a signal informing a driver that the detected preceding vehicle meets the preselected tracking condition, a control initiating means which responds to the driver's manual operation after the driver is informed that the detected preceding vehicle, meets the preselected tracking condition, and provides a control initiating signal, and an inter-vehicle distance controlling means for controlling the speed of the controlled vehicle such that the controlled vehicle tracks the preceding vehicle detected at a set constant interval therebetween.

In the preferred mode, a detected preceding vehicle identifying means is further provided which monitors the preceding vehicle being tracked. When the preceding vehicle has moved out of the detection range of the preceding vehicle detecting means, the inter-vehicle distance controlling means is deactivated.

After the preceding vehicle has moved out of the detection range of the preceding vehicle detecting means, a current vehicle speed may be maintained for a preselected period of time.

The preceding vehicle detecting means may be designed to monitor the separation distance and relative speed between the controlled vehicle and the preceding vehicle. When variations in either the separation distance or the relative speed are smaller than preselected threshold values, it may be concluded that the preceding vehicle has been detected.

In addition, an inter-vehicle distance setting switch may further be provided which responds to the manual operation of the driver and provides a signal indicative of the current interval to the preceding vehicle. The control initiating means, responsive to the signal from the inter-vehicle distance setting switch, provides a control initiating signal to have the controlled vehicle track the preceding vehicle detected at the current interval.

The preselected tracking condition may be defined by the relationship between the distance from the preceding vehicle and the relative speed of the preceding vehicle.

When several vehicles exist in a front detection area of the preceding vehicle detecting means, the preceding vehicle detecting means may identify the closest one of the plurality of vehicles traveling ahead as the preceding vehicle.

If a preceding vehicle was not detected in the previous control cycle, the difference between the interval to the preceding vehicle identified in a last control cycle and the interval to the currently detected preceding vehicle is determined. When the interval difference is smaller than a preselected value, the detected preceding vehicle identifying means may consider the preceding vehicle identified in the last control cycle to exist in the front detection area of the preceding vehicle detecting means.

upon command of an initiating constant inter-vehicle distance control signal, the inter-vehicle distance controlling means determines a target rate of change in Speed of the controlled vehicle. The target rate of change is based on the relative speed between the controlled and preceding vehicles, a target interval to the preceding vehicle selected by the driver, and the actual interval to the preceding vehicle. A target vehicle speed for maintaining the set constant interval to the preceding vehicle is then determined based on the target rate of change in speed of the controlled vehicle.

The inter-vehicle distance controlling means controls the speed of the controlled vehicle by modifying a throttle valve opening, controlling the transmission and/or controlling the brake.

The system further includes a curvature determining means for determining the curvature of the road on which the controlled vehicle is traveling and a probability determining means for determining a probability that the detected preceding vehicle is traveling in the same traffic lane as the controlled vehicle during cornering on a curved road, based on the curvature determined by the curvature determining means.

The curvature determining means may determine a radius of curvature of the curved road based on the angle at which the controlled vehicle is steered and the speed of the controlled vehicle.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
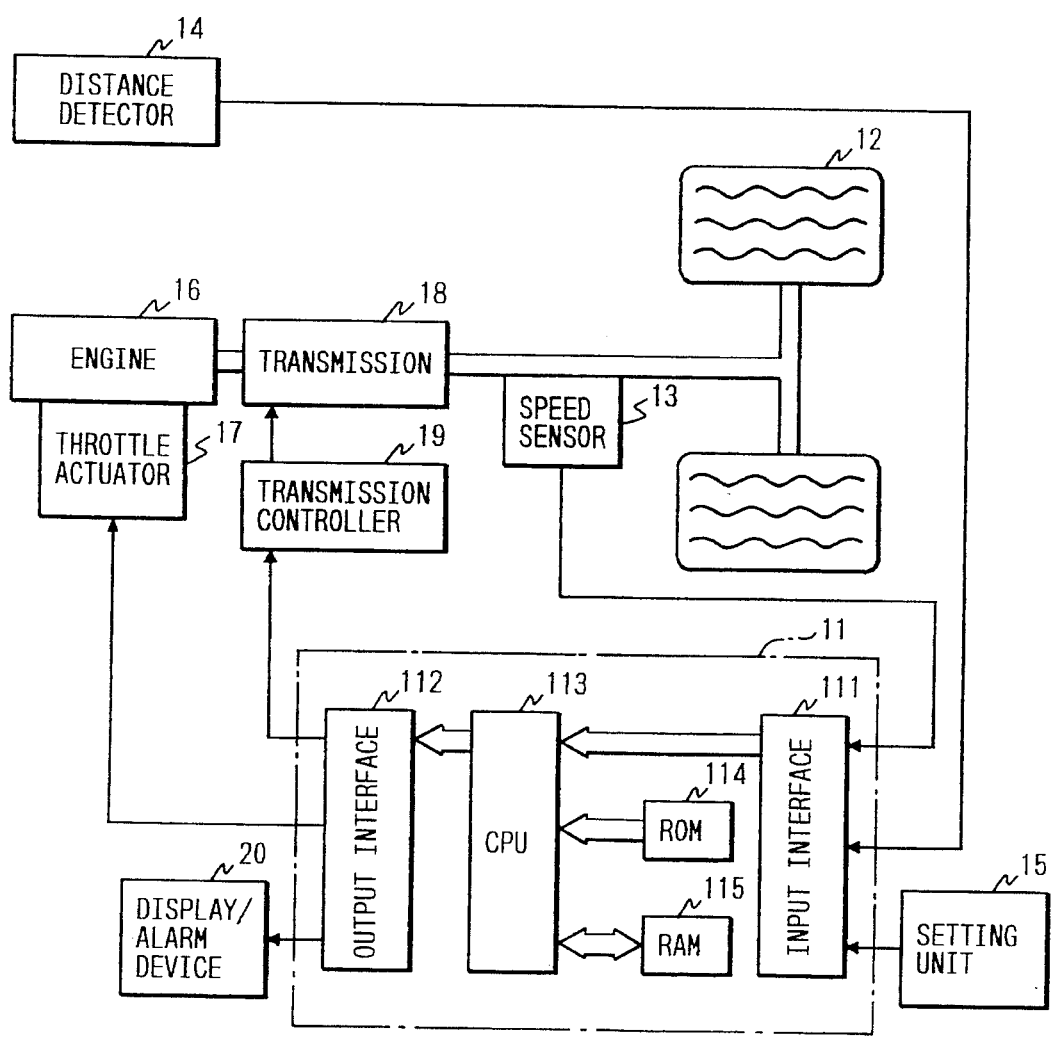
FIG. 1 is a block diagram which shows a vehicle speed control system according to the present invention.

Referring now to the drawings, wherein like numbers refer to like parts in several views, particularly to FIG. 1, there is shown a vehicle speed control system according to the present invention.

The vehicle speed control system includes generally a control unit 11, a vehicle speed sensor 13, an inter-vehicle distance detector 14, a throttle actuator 17, a transmission controller 19, and a manual setting unit 15.

The control unit 11 includes an input interface 111, an output interface 112, a CPU 113, a ROM 114, and a RAM 115. The input interface 111 receives speed control parameter input signals. The output interface 112 outputs control signals based on the provided speed control parameters input signals. The ROM 114 stores programs for performing control operation and various maps for calculation operations of the CPU 113. The RAM 114 stores information based on calculation control.

The vehicle speed sensor 13 is arranged to monitor a vehicle speed to provide a signal indicative thereof to the control unit 11. For example, the vehicle speed sensor 13 may detect rotational speed of a wheel 12 to determine the vehicle speed. The inter-vehicle distance detector 14 monitors the distance between the vehicle incorporating this system and an object present ahead, for example, a preceding vehicle, and outputs a signal indicative thereof to the control unit 11. The manual setting unit 15 provides some set signals selected by a driver to the control unit 11.

The inter-vehicle distance detector 14 includes a radar unit such as well-known laser radar or millimeter wave radar, both of which are designed to emit an electromagnetic wave in a forward direction and receive the reflected wave from an object present in a front detection area so as to measure the interval therebetween. The inter-vehicle distance detector 14 may further include a display unit for displaying a detected object. The manual setting unit 15, as will be described in more detailed hereinafter, includes selectors for manually selecting a target inter-vehicle distance and a vehicle speed limit, and a switch for switching between constant inter-vehicle distance control and constant speed control (i.e., cruise control).

The control unit 11 responds to input signals from the speed sensor 13, the inter-vehicle distance detector 14, and the manual setting unit 15 to provide control signals to the throttle actuator 17, the transmission controller 19, and a display/alarm device 20. The throttle actuator 17 actuates a throttle mechanism to modify the speed of an engine 16. The transmission controller 19 controls operation of a transmission 18 transmitting engine torque to the wheels for controlling a traveling speed of the vehicle. The display/alarm device 20 is installed adjacent the driver for displaying required driving information and triggering an alarm to the driver, as necessary. In addition, the control unit 11 may control a brake actuator (not shown) for the vehicle speed control.

Figure 2:
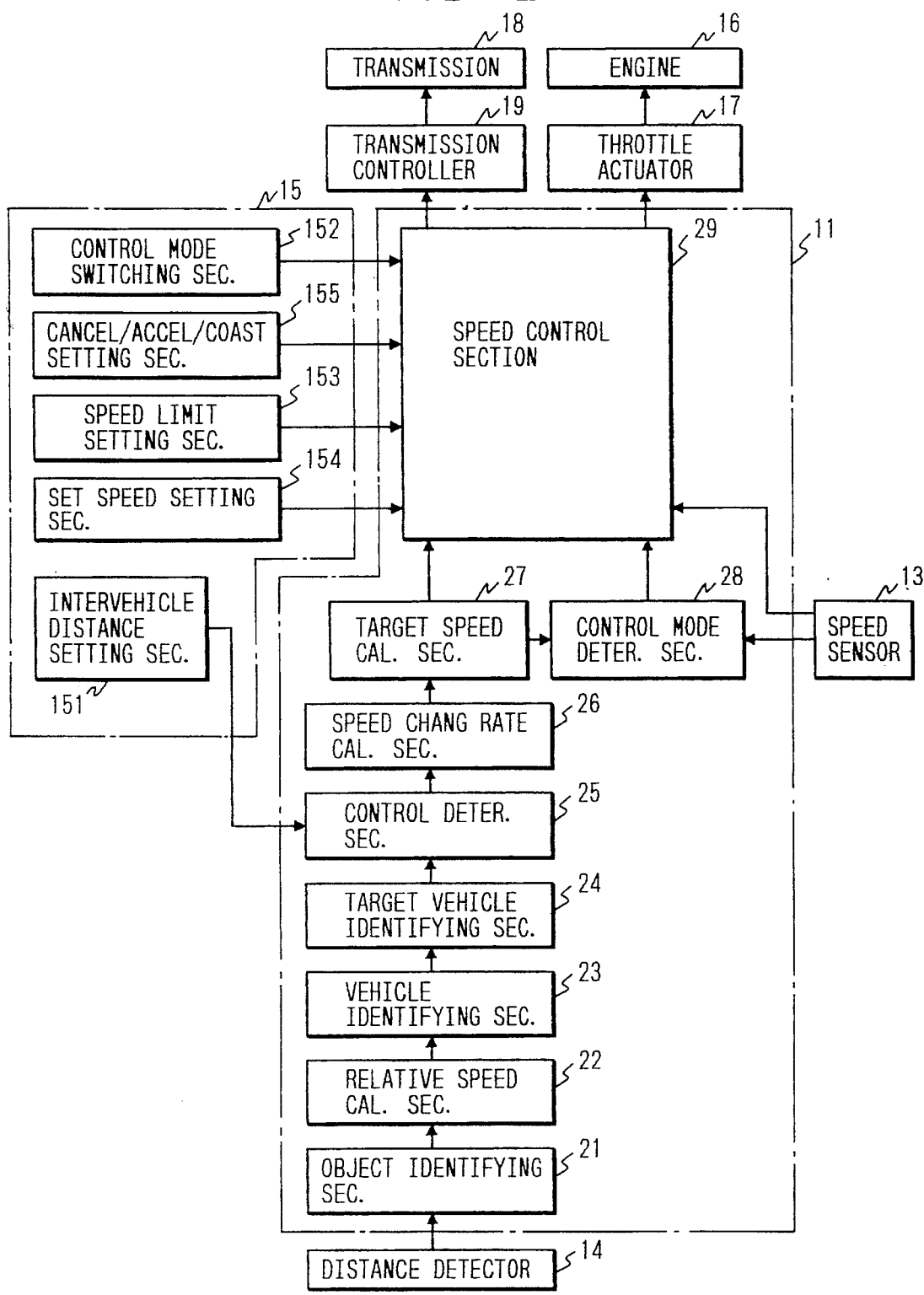
FIG. 2 is a block diagram which shows a speed control section of a vehicle speed control system of the invention.

Referring to FIG. 2, the manual setting unit 15 includes a control mode-switching section 152, a cancel/accel/coast-setting section 155, a vehicle speed limit-setting section 153, a set vehicle speed-setting section 154, and an inter-vehicle distance-setting section 151.

The inter-vehicle distance-setting section 151 provides a signal representative of a target inter-vehicle distance of interest to the driver by a manual operation thereof. The control mode-switching section 152 switches between an inter-vehicle distance control mode and a cruise control mode. The vehicle speed limit-setting section 153 outputs a maximum speed signal according to the manual operation of the driver for determining a maximum vehicle speed capable of being maintained under the constant inter-vehicle distance control. The cancel/accel/coast-setting section 155 performs cancellation of control, acceleration (increase in vehicle speed, or decrease in inter-vehicle distance), and a coast (decrease in vehicle speed, or increase in inter-vehicle distance).

The control mode-switching section 152, the cancel/accel/coast-setting section 155, the vehicle speed limit-setting section 153, and the set vehicle speed-setting section 154 provide setting signals to a speed control section 29. The inter-vehicle, distance-setting section 151 provides a set signal to a control initiation/continuation/termination-determining section 25, as will be described later.

Additionally, inter-vehicle distance information from the inter-vehicle distance detector 14 is input to an object-identifying section 21. The object-identifying section 21 determines whether an object is detected or not according to a variation in distance detected within a preselected unit of time. In addition, when the object is detected a distance to the object is calculated using a statistical analysis.

The detection state and the calculated distance to the object in the object-identifying section 21 are input to a relative speed calculation section 22. The relative speed calculation section 22 then determines a relative speed between the system vehicle and the object detected based on a variation in detected distance per a predetermined control cycle, and provides a signal to a vehicle-identifying section 23.

The vehicle-identifying section 23 monitors a variation in the relative speed per preselected unit of time determine whether the object detected is a vehicle or not, and provides a signal indicative thereof to a target vehicle-identifying section 24.

The target vehicle-identifying section 24 determines whether the vehicle identified by the vehicle-identifying section 23 meets given initiating conditions for the constant inter-vehicle distance control when a vehicle tracking operation is started, and during the vehicle tracking operation, it is determined if a vehicle currently tracked is a target vehicle which is originally identified. The results of determination are input to the control initiation/continuation/termination-determining section 25.

The control initiation/continuation/termination-determining section 25 is responsive to the signal from the target vehicle-identifying section 24 to determine whether the constant inter-vehicle distance control should be initiated, continued, or terminated based on the inter-vehicle distance and the relative speed inputted. In addition, the section 25 receives a signal from the inter-vehicle distance-setting section 151 to provide the target inter-vehicle distance selected by the driver to a speed change rate calculation section 26.

The speed change rate calculation section 26 determines a target rate of change in vehicle speed based on the target inter-vehicle distance, the relative speed to the identified vehicle, and an actual inter-vehicle distance to the identified vehicle. A target vehicle speed-determining section 27 integrates the target rate of change in vehicle speed to determine a target vehicle speed, and provides a signal indicative thereof to a control mode-determining section 28.

The control mode-determining section 28 compares the target vehicle speed with an actual vehicle speed currently monitored by the vehicle speed sensor 13 to determine which is the better alternative, to perform throttle control by the throttle actuator 17 or to control the transmission 18 through the transmission controller 19.

The outputs from the target vehicle speed-determining section 27 and the control mode-determining section 28 are supplied to the speed control section 29. The speed control section 29 then controls the throttle actuator 17 of the engine 16 to regulate an opening degree of a throttle valve for performing the cruise control, thereby modifying the actual vehicle speed to agree with the target vehicle speed. In addition, when it is also required to have the transmission controlled, the speed control section 29 provides a control signal to the transmission controller 19 to change gear.

Additionally, the speed control section 29 responds to the signal from the control mode-switching section 152 to select either the cruise control or the constant inter-vehicle distance control according to the interest to the driver. When the driver selects the constant inter-vehicle distance control, an interval between the identified vehicle (i.e., a preceding vehicle) and the system vehicle is controlled to keep a constant value. Alternatively, when the driver selects the cruise control, the system vehicle is controlled to travel at a constant speed (i.e., the set speed selected by the driver through the set vehicle speed-setting section 154). Further, when the driver selects the cruise control during the constant inter-vehicle distance control, the cruise control is performed at a current vehicle speed. Conversely, when the driver selects the constant inter-vehicle distance control during the cruise control, the inter-vehicle distance control relative to the identified vehicle is initiated from the time the driver sets the target inter-vehicle distance through the inter-vehicle distance setting section 151.

Referring to FIGS. 3 to 8, there are shown flowcharts of a program or sequence in logical steps performed by the control unit 1 of the vehicle speed control system.

After entering the program, the routine proceeds to step 300 wherein it is determined whether the driver has selected the cruise control mode or the constant inter-vehicle distance control mode through the control mode-switching section 152. If the cruise control mode is selected, the routine then proceeds to step 301 wherein the cruise control is performed to have the system vehicle travel at a target vehicle speed selected by the driver through the set vehicle speed-setting section 154. When the cruise control is selected during the constant inter-vehicle distance control, a current vehicle speed is, as mentioned above, set as the target vehicle speed.

Alternatively, if it is determined that the constant inter-vehicle distance control mode is selected in step 300, the routine then proceeds to step 302 wherein an inter-vehicle distance (i.e., an interval to an object present ahead) is determined based on the signal from the inter-vehicle distance detector 14. Subsequently, in step 303, a variation in the inter-vehicle distance within a preselected control cycle is determined.

The routine then proceeds to step 304 wherein it is determined whether the variation in inter-vehicle distance determined in step 303 is greater than a preselected threshold value T. If the variation in inter-vehicle distance is greater than the threshold value T, indicating that no object exists in front of the system vehicle, the routine then proceeds to step 305.

In step 305, values of the inter-vehicle distance and the relative speed are set to zero (0), and information indicating an object non-detecting state wherein there is no object in the forward detection area of the inter-vehicle distance detector 14, is stored in a buffer.

Alternatively, if the variation in inter-vehicle distance is smaller than the threshold value T in step 304, it is then concluded that an object exists in the forward detection area (i.e., an object detecting state). The routine proceeds to step 306 wherein based on the variation in inter-vehicle distance, the relative speed to the object is determined. In step 307, the relative speed determined is stored in the buffer. When the inter-vehicle distance detector 14 is capable of determining the relative speed using the Doppler shift of a reflected wave from the object, step 306 may be omitted.

Subsequently, after step 307, a preselected number of values indicating the relative speed to the object present ahead are sequentially stored, and the routine proceeds to step 308 wherein based on the values of the relative speed sequentially stored in the buffer, a variation in the relative speed in a preselected period of time, for example 0.5 sec., is determined.

In step 309, it is determined whether the variation in the relative speed derived in step 308 is greater than a given threshold value S. If a NO answer is obtained, then the object present ahead is identified as a vehicle, and the routine proceeds to step 310 wherein the inter-vehicle distance and the relative speed to the identified vehicle and information indicating a vehicle-identifying state wherein the vehicle is now being detected, are stored in the buffer.

Alternatively, if a YES answer is obtained in step 309, that is, the variation in the relative speed is greater than the given threshold value S, it is concluded that the object present ahead is not a vehicle. The routine then proceeds to step 311 wherein the distance to the object is stored in the buffer, the relative speed is set to zero, and information indicating an object-identifying state wherein the object present ahead is an object other than a vehicle, is stored in the buffer.

The above processes may be carried out in the inter-vehicle distance detector 14. In addition, the above series of processes may be performed at the same time for a plurality of objects and vehicles as long as they can be identified according to differences in inter-vehicle distance and relative speed.

Figure 7:
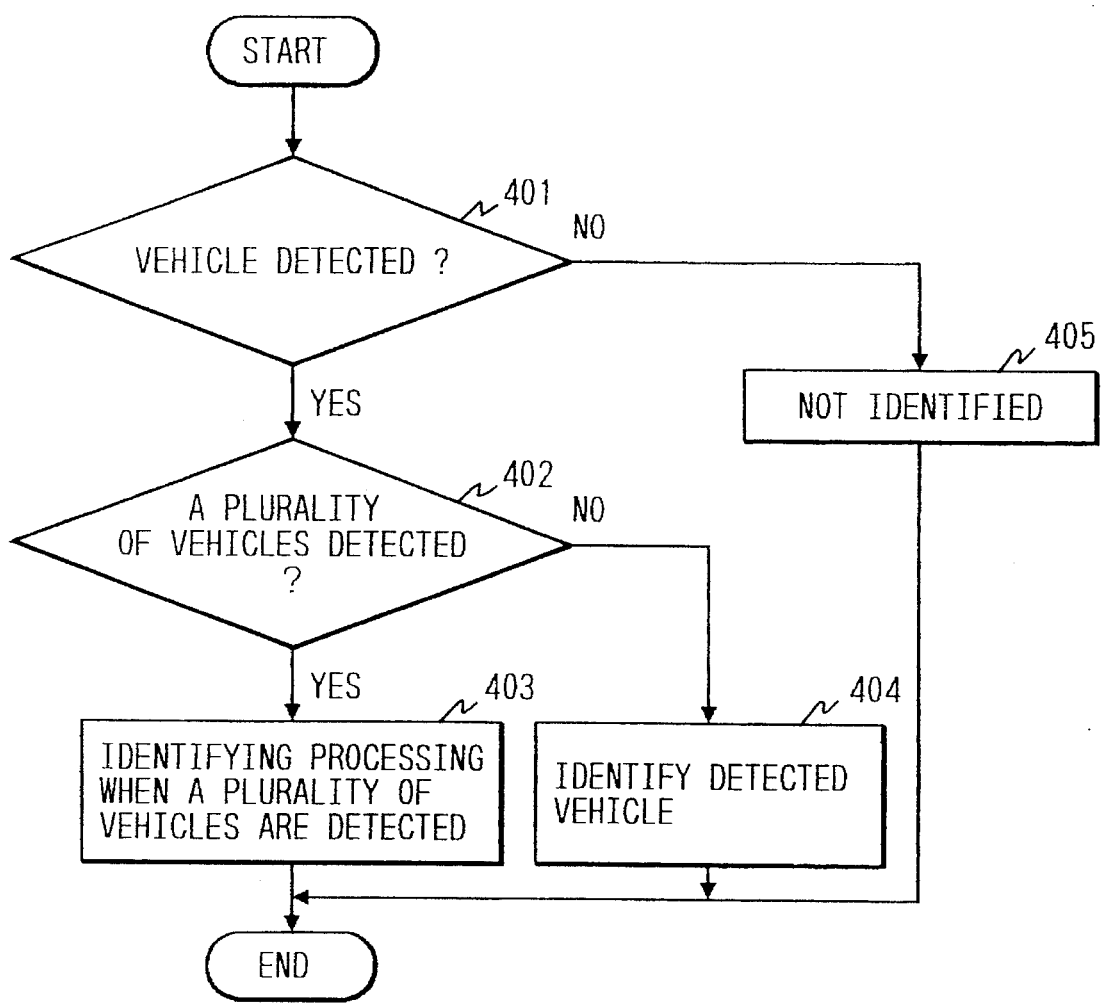
Figure 8:
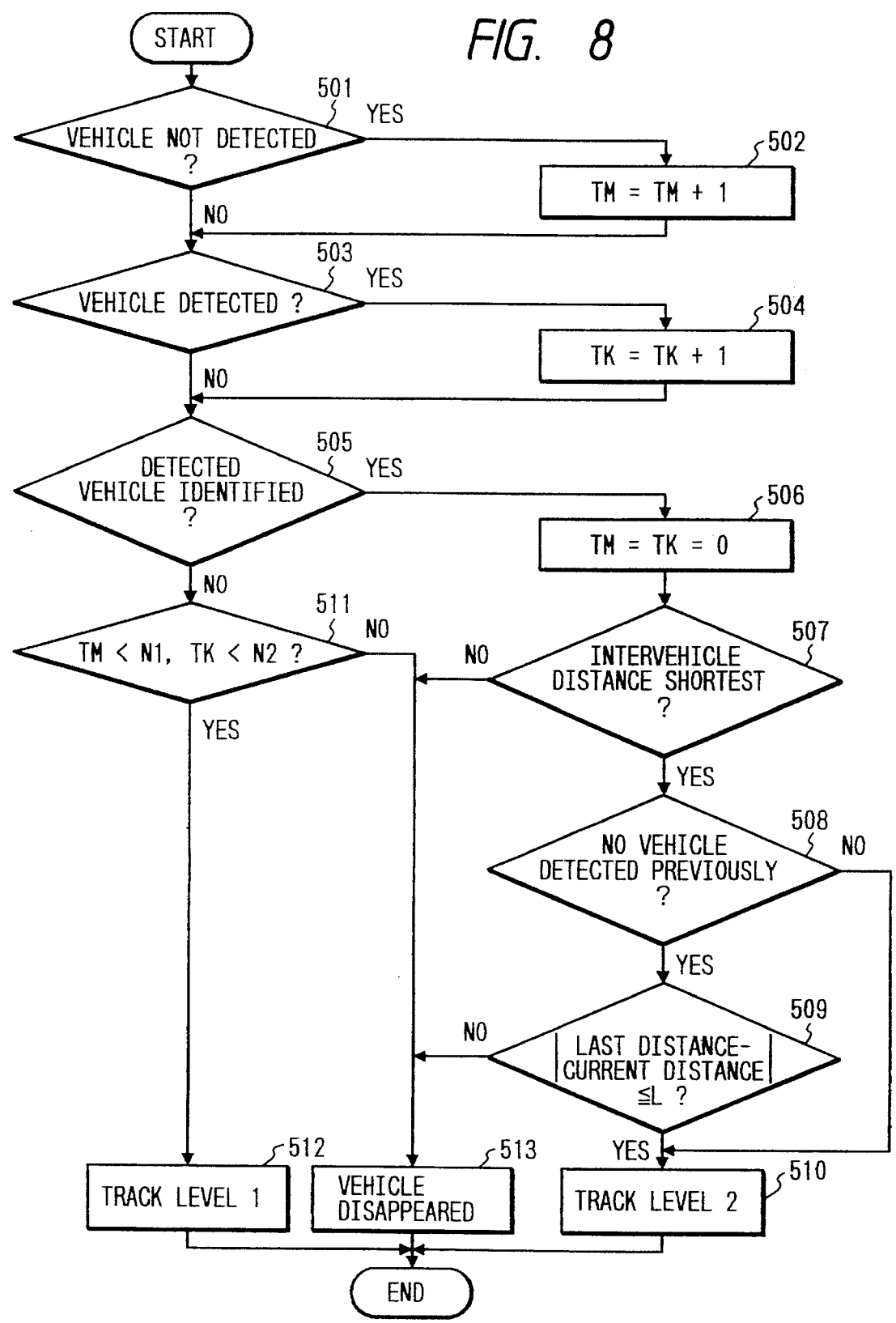

After step 310, 311, or 305, the routine proceeds to step 312 wherein it is determined whether the constant inter-vehicle distance control to the identified vehicle has been initiated in the previous run (i.e., one program cycle before) or not. If it is determined that the constant inter-vehicle distance control is not yet performed, the routine then proceeds to step 313 wherein processing of identifying a vehicle to be tracked, as will be discussed with reference to FIG. 7, is performed. Alternatively, if it is concluded that the constant inter-vehicle distance control has been initiated in the previous program cycle, the routine then proceeds to step 314 wherein processing of determining whether a vehicle tracked in the previous control cycle can be identified in a current control cycle, as will be described later with reference to FIG. 8, is performed.

The tracking vehicle-identifying processing will be discussed below with reference to FIG. 7.

Initially, in step 401, it is determined whether a detected vehicle exists. If a NO answer is obtained, the routine proceeds to step 405 wherein information indicating a vehicle undetecting state is stored. Alternatively, if there is a detected vehicle, the routine then proceeds to step 402 wherein it is determined whether a plurality of vehicles are detected.

If only one vehicle is detected, the routine then proceeds to step 404 wherein the detected vehicle is identified based on a preselected relation between an inter-vehicle distance and relative speed to the detected vehicle, and stored in the buffer. Alternatively, if a plurality of vehicles are detected, the routine then proceeds to step 403 wherein only one vehicle is identified according to a preselected regime, and an inter-vehicle distance and relative speed to the detected vehicle are stored. The preselected regime is such that a vehicle traveling at the shortest inter-vehicle distance is selected from among the plurality of detected vehicles. In addition, when some vehicles are traveling at substantially the same shorter inter-vehicle distance, it is determined that the detected vehicles are unidentifiable.

Figure 4:
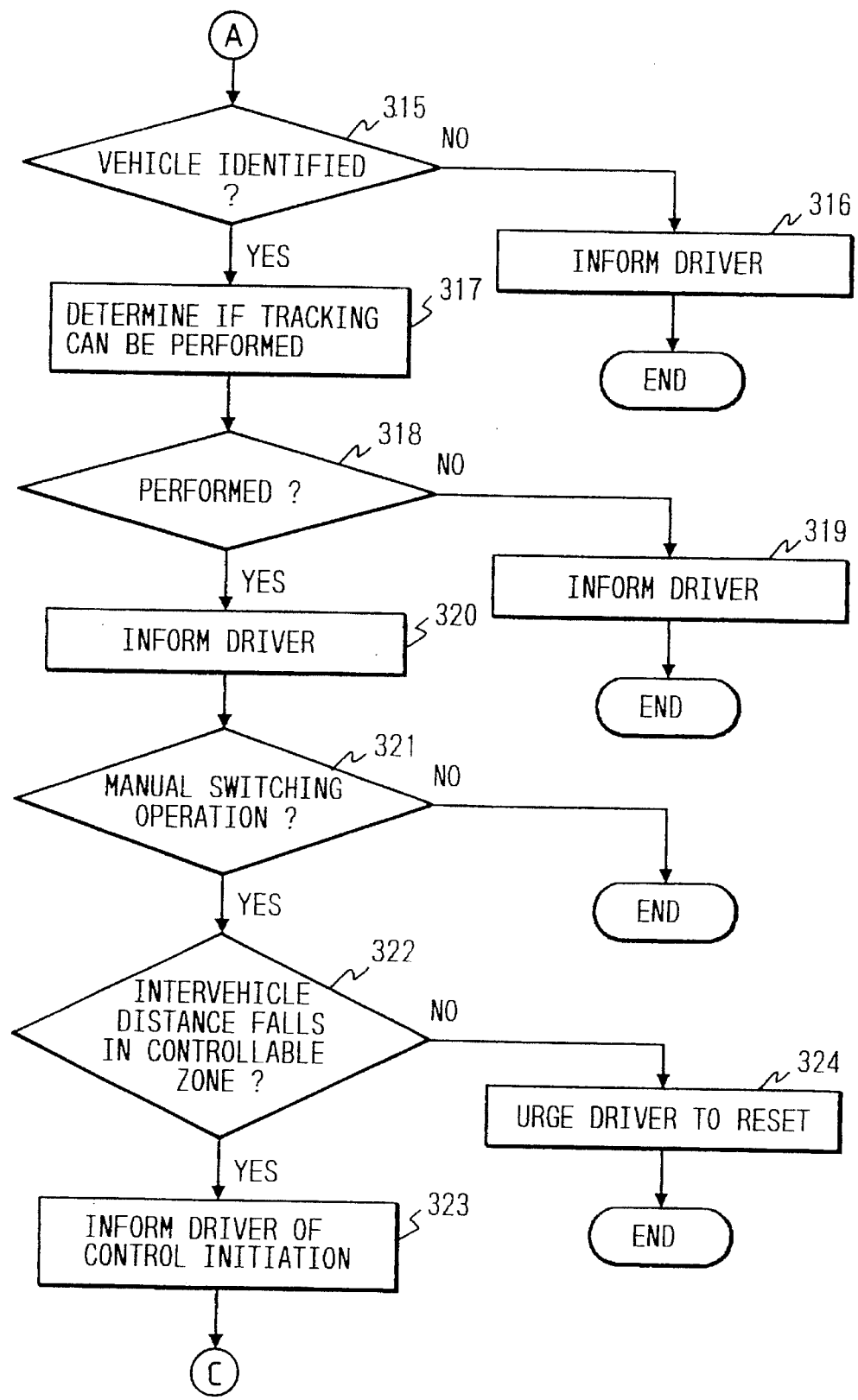

Subsequently, the routine then proceeds to step 315, as shown in FIG. 4, wherein it is determined whether a vehicle to be tracked has been identified. If not, the routine then proceeds to step 316 wherein information indicative thereof is reported to the driver through the display/alarm device 20. If a vehicle to be tracked has been identified, the routine then proceeds to step 317 wherein determination is made whether or not the system vehicle is placed in a condition wherein it is possible to track or follow the identified vehicle. This determination will be explained in detail with reference to FIG. 9.

It is first determined if an inter-vehicle distance to the identified vehicle falls within an inter-vehicle distance controllable zone, as hatched in the drawing. If within this zone, it is determined if a relation between the inter-vehicle distance and the relative speed lies in a region, as hatched in FIG. 10, defined by boundary lines A and B. If these two conditions, as shown in FIGS. 9 and 10, are met, it is determined that the system vehicle can track the identified vehicle at a selected constant interval.

Figure 9:
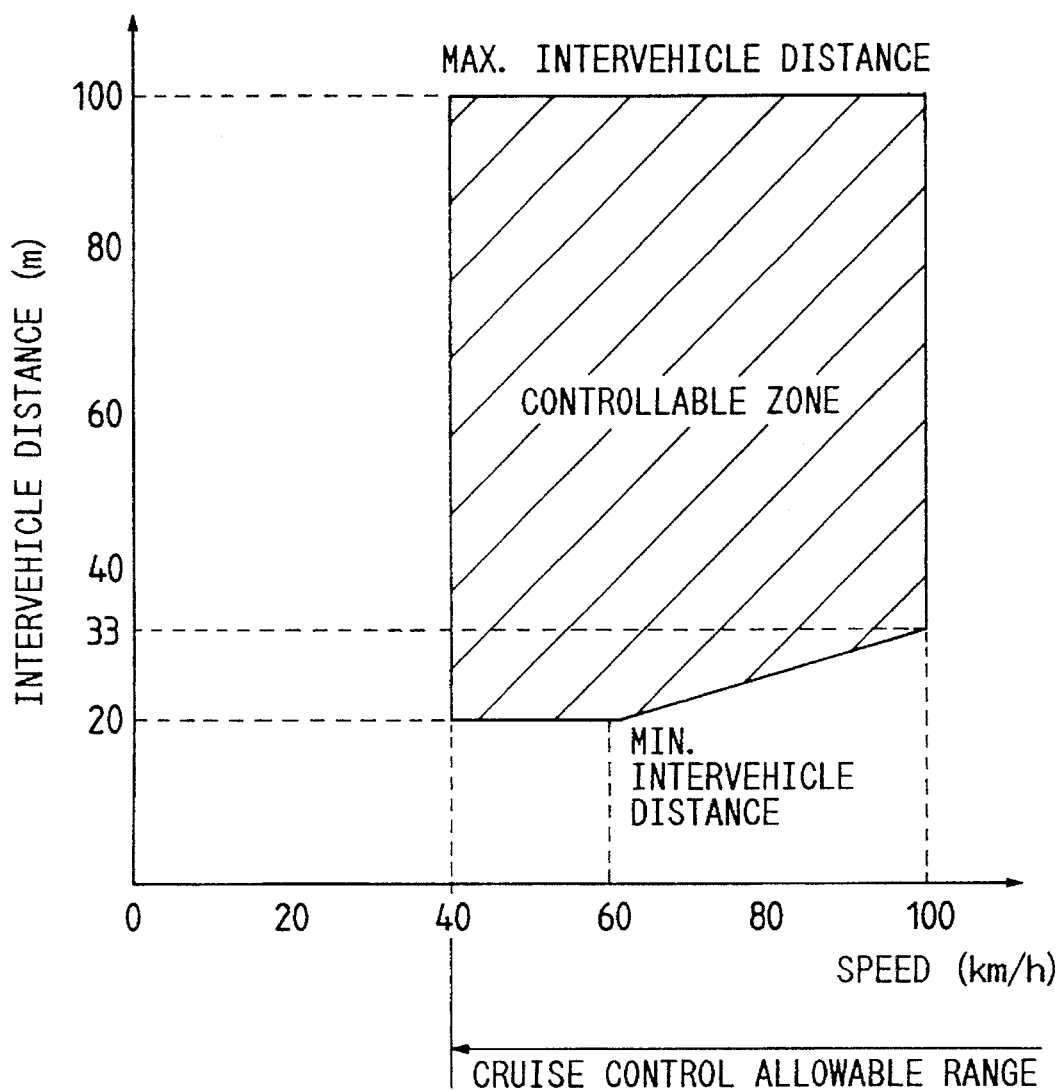
FIG. 9 is a graph which shows an inter-vehicle distance controllable zone defined by the relationship between an inter-vehicle distance by a preceding vehicle and a relative speed therebetween.

The inter-vehicle distance controllable zone, as shown in FIG. 9, defines minimum and maximum controllable inter-vehicle distances according to vehicle speed. In the illustrated example, the minimum controllable inter-vehicle distance is set to a time headway of 1.2 sec for safety, while the maximum controllable inter-vehicle distance is set to a maximum detectable distance of the inter-vehicle distance detector 14.

Figure 10:
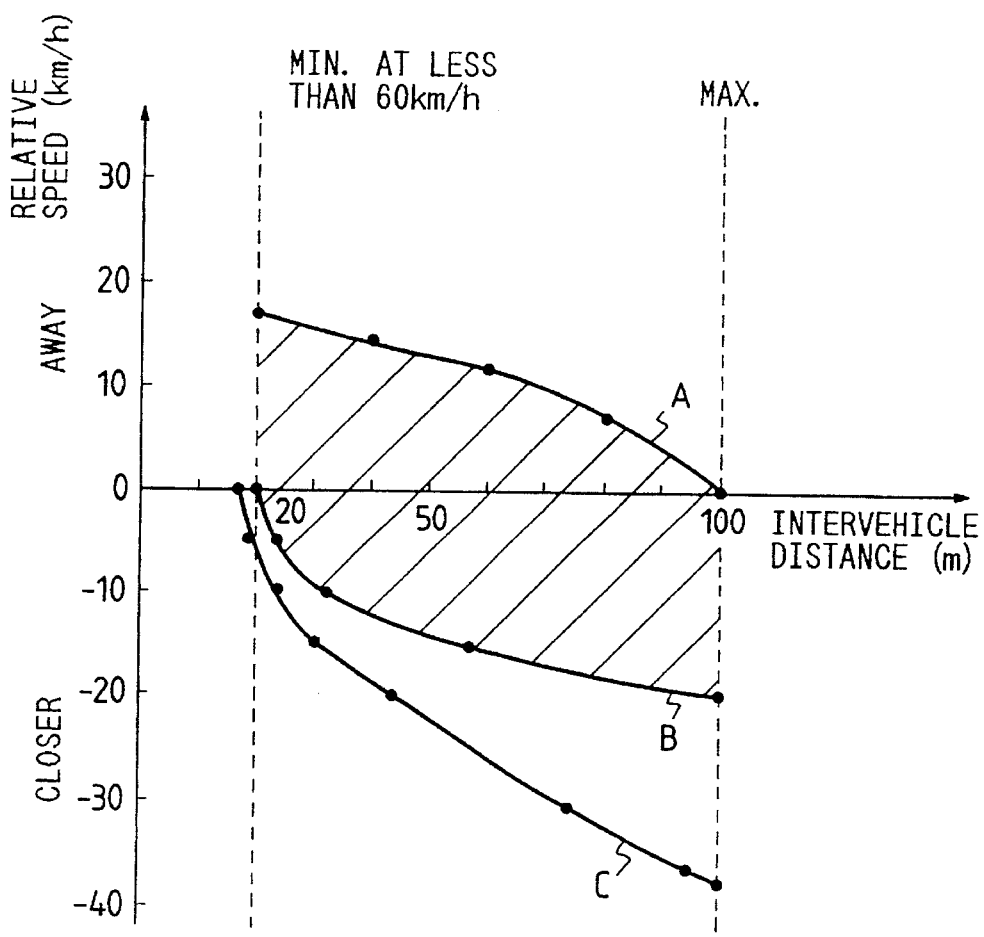
FIG. 10 is a graph which shows an inter-vehicle distance area wherein a controlled vehicle can track a preceding vehicle.

The boundary line A, as shown in the relative speed-inter-vehicle distance graph of FIG. 10, is defined by plotting maximum relative speeds with respect to inter-vehicle distances allowing the system vehicle to follow an identified preceding vehicle at a relative speed of approximately zero when the system vehicle starts to track the identified preceding vehicle at an acceleration of 2 km/h/sec. The relative speed must be comfortable to the driver, while preventing the identified preceding vehicle from traveling away from a maximum front detectable zone of the inter-vehicle distance detector 14, two minutes after driver's perception (under the assumption that a driver's operational lag time is usually on the order of two minutes). The boundary line B is plotted by relative speeds with respect to inter-vehicle distances defining an area where a distance required for the system vehicle to coast at a deceleration of 0.03 G for establishing a relative speed of zero is more than 20 m, but not smaller than half of an inter-vehicle distance at the time the control is started (i.e., a target-inter-vehicle distance selected by the driver).

Returning back to FIG. 4, in step 318, it is determined whether it is possible for the system vehicle to track the identified preceding vehicle. If a YES answer is obtained, the routine then proceeds to step 320 wherein the display/alarm device 20 informs the driver that the system vehicle can track the identified preceding vehicle (being detected by the inter-vehicle distance detector 14) using, for example an indicator lamp showing a value of the inter-vehicle distance to the identified preceding vehicle.

Alternatively, if a NO answer is obtained in step 318, the routine then proceeds to step 319 wherein information that the system vehicle cannot track the preceding vehicle detected, is given to the driver. It should be noted that steps 316 and 319 may be omitted as necessary.

After step 320, the routine proceeds to step 321 wherein it is determined whether the driver has performed a setting operation through the inter-vehicle distance setting section 151. This determination is made for making sure whether the driver, after perceiving that the system vehicle can track the identified preceding vehicle, has controlled an acceleration pedal to modify an interval to the identified preceding vehicle to a desired value, and has operated the inter-vehicle distance-setting section 151.

If a NO answer is obtained in step 321, the routine then returns back to the initial step. Alternatively, if a YES answer is obtained, the routine then proceeds to step 322 wherein an inter-vehicle, distance to the identified preceding vehicle at the time the driver has set the inter-vehicle distance-setting section 151, is stored, and it is determined whether the inter-vehicle distance stored falls within the inter-vehicle distance controllable zone, as shown in FIG. 9.

If a YES answer is obtained, the routine then proceeds to step 323 wherein information that the constant inter-vehicle distance control has been started at the inter-vehicle distance selected by the driver, is given to the driver. Alternatively, if a NO answer is obtained in step 322 meaning that the inter-vehicle distance selected by the driver lies out of the inter-vehicle distance controllable zone, the routine then proceeds to step 324 wherein a signal urging the driver to reset the inter-vehicle distance-setting section 151, is provided.

The operation during tracking the identified preceding vehicle will be discussed with reference to FIG. 8.

Figure 3:
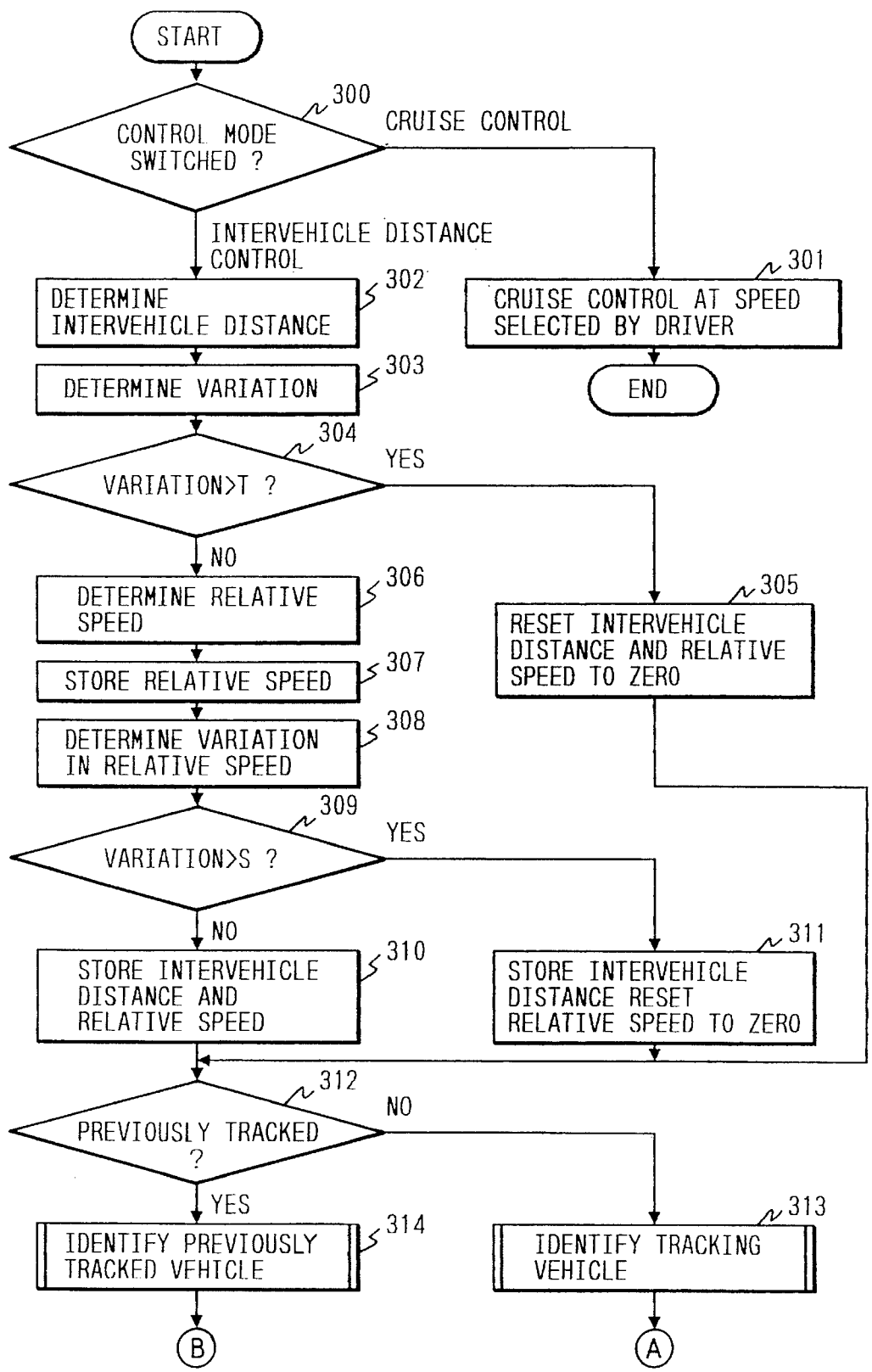
FIGS. 3 to 8 are flowcharts which show logical steps performed by a speed control unit of the invention.

If in step 312, as shown in FIG. 3, it is concluded that the constant inter-vehicle distance control has been started in the previous control cycle, in step 314 it is determined whether the preceding vehicle tracked in the previous control cycle can also be tracked in the current control cycle. This determination is made according to the logical steps, as shown in FIG. 8.

After entering step 314, the routine proceeds to step 501 wherein it is determined whether a preceding vehicle to be identified is detected, that is, whether the system is in a vehicle non-identifying state. This determination is, as already mentioned, accomplished by monitoring a sensor signal from the inter-vehicle distance detector 14 detected in each control cycle to derive a variation in value of the sensor signal.

If a preceding vehicle to be identified is not detected, the routine then proceeds to step 502 wherein a timer value TM is incremented every control cycle for measuring the length of time during which the preceding vehicle to be identified is not detected. Subsequently, the routine then proceeds to step 503 wherein it is determined whether a preceding vehicle to be identified is detected.

If a YES answer is obtained, the routine then proceeds to step 504 wherein a timer value TK is incremented every control cycle for measuring the length of time during which a preceding vehicle to be identified is detected. Subsequently, the routine then proceeds to step 505 wherein it is determined whether the preceding vehicle detected is identified as a vehicle to be tracked or not.

If a YES answer is obtained, the routine then proceeds to step 51216 wherein the timer values TM and TK are reset to zero, and the routine proceeds to step 507. In step 507, when a plurality of preceding vehicles are detected, it is determined whether an inter-vehicle distance to the identified preceding vehicle is smallest. This determination is made because a vehicle traveling on another lane may squeeze ahead of the system vehicle, causing a minimum inter-vehicle distance to be changed. In step 507, the inter-vehicle distance to the identified preceding vehicle may be further compared with that of an object detected in determination of whether the inter-vehicle distance to the identified preceding vehicle is the smallest value.

If in step 507, it is concluded that the inter-vehicle distance to the identified preceding vehicle is not smallest, the routine then proceeds to step 513 wherein information that the preceding vehicle identified in the previous control cycle has disappeared, that is, that the system vehicle has lost the identified preceding vehicle, is stored in the buffer and reported to the driver. Alternatively, if it is concluded that the inter-vehicle distance to the identified preceding vehicle is smallest, the routine then proceeds to step 508 wherein it is determined whether a condition wherein a preceding vehicle cannot be detected exists in a previous control cycle (one program cycle before) or not.

If a NO answer is obtained, the routine then proceeds to step 510 wherein information that the system vehicle is tracking at level 2, is stored. The tracking at level 2 means that a preceding vehicle which was identified in the previous control cycle is also identified in the current control cycle or a similar condition having a higher identification accuracy. This condition is encountered when a YES answer is obtained in the following step 509.

Alternatively, if a preceding vehicle was not detected in the previous control cycle, the routine then proceeds to step 509 wherein an inter-vehicle distance to a preceding vehicle last identified is compared with an inter-vehicle distance to the preceding vehicle currently identified to determine whether an absolute value of a difference in inter-vehicle distance is smaller than or equal to a preselected threshold value L, for example 3 m. If a NO answer is obtained meaning that the absolute value of the difference in inter-vehicle distance is greater than the threshold value L, the routine then proceeds to step 513. Alternatively, if a YES answer is obtained, the routine then proceeds to step 510.

In step 505, if a NO answer is obtained concluding that a preceding vehicle to be identified is not yet identified, the routine then proceeds to step 511 wherein the timer values TM and TK are compared with predetermined values N1 and N2. For example, N1 and N2 may be set to 0.2 and 0.5 sec., respectively. If both the timer values TM and TK are smaller than the values N1 and N2, respectively (TM<N1 and TK<N2), the routine then proceeds to step 512 wherein information that the system vehicle is tracking at level 1, is stored. The tracking at level 1 indicates a lower identification accuracy meaning that the system identified a preceding vehicle in the previous control cycle, but does not yet identify a preceding vehicle in the current control cycle. Alternatively, if a NO answer is obtained in step 511, the routine then proceeds to step 513 wherein the condition wherein the preceding vehicle identified in the previous control cycle has disappeared, is stored in the buffer.

Figure 5:
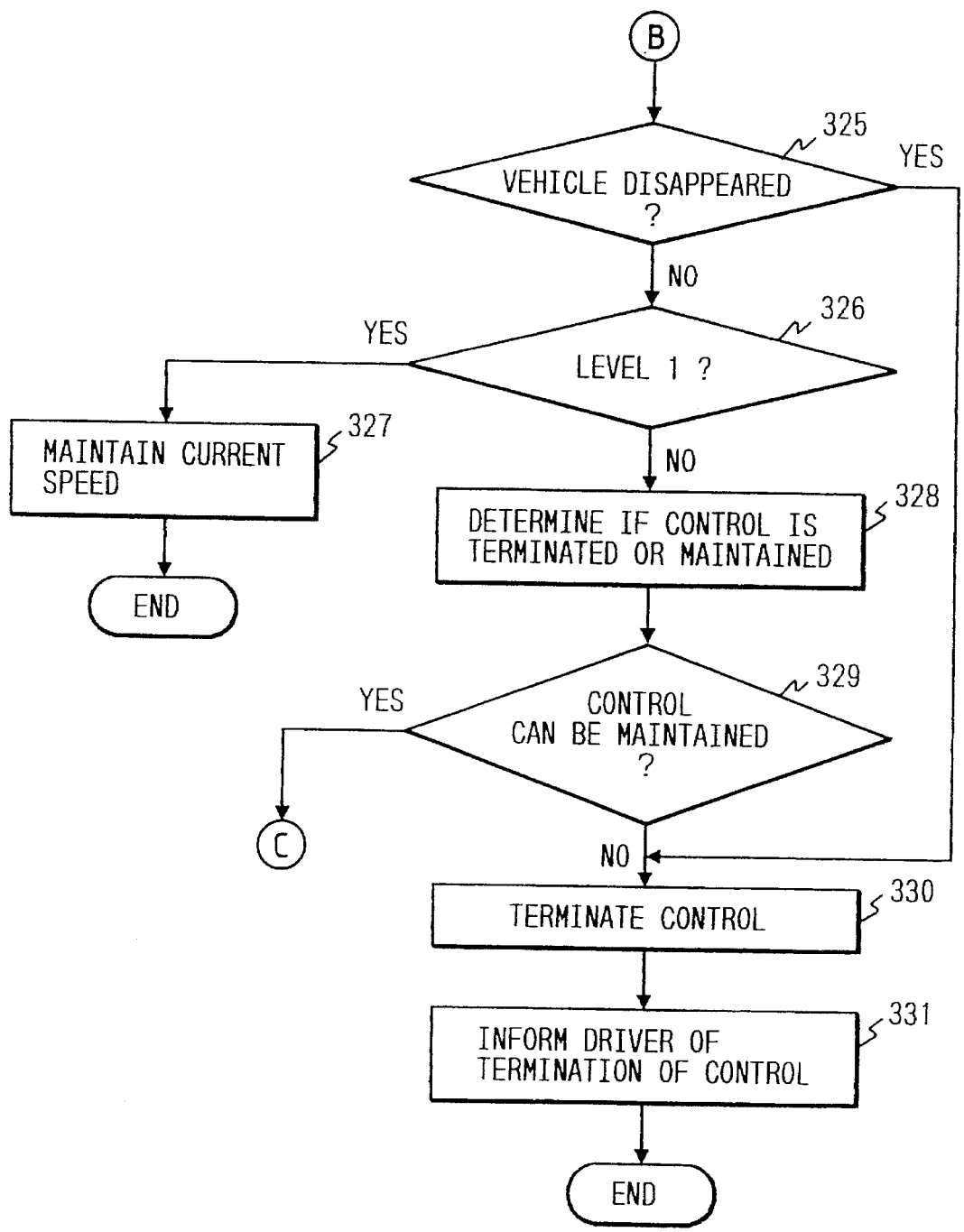

After step 510, 512, or 513, the routine proceeds to step 325, as shown in FIG. 5. In step 325, it is confirmed whether the system vehicle has lost the preceding vehicle identified in the previous control cycle. If a YES answer is obtained, the routine then proceeds to step 330 wherein the constant inter-vehicle distance control is terminated, and the system vehicle is brought into a coast condition wherein the throttle valve is fully closed. The routine proceeds to step 331 wherein the display/alarm device 20 informs the driver that the constant inter-vehicle distance control has been terminated. Thus, the system vehicle is brought under driver's manual operation.

The constant inter-vehicle distance control-terminating operation may be performed by closing the throttle valve gradually over a given period of time to bring the system vehicle into the coast condition. This control allows the driver to have a sufficient time required for perceiving the termination of the control before the system vehicle is brought into the coast condition completely.

Alternatively, if in step 325, it is concluded that the preceding vehicle identified in the previous control cycle has not disappeared, the routine then proceeds to step 326 wherein it is determined whether a tracking level is one (1) or not. If a YES answer is obtained, the routine goes to step 327 wherein a current vehicle speed is maintained. This is because the system vehicle is basically controlled so as to track an identified preceding vehicle only, however, the system may lose the identified preceding vehicle due to traveling on a curved or uneven road or ascending and descending a slope. The current vehicle speed- maintaining operation during the tracking at level 1 leaves the driver free from a control resetting operation when the system has lost the identified preceding vehicle for a period of time during which the timer values TH and TK are smaller than the N1 and N2.

Alternatively, if a NO answer is obtained in step 326 meaning that the tracking level is not the level 1, the routine then proceeds to step 328 wherein it is determined whether the constant inter-vehicle distance control should be terminated or maintained by looking up a boundary line C, as shown in FIG. 10. The boundary line C is defined by plotting a relative speed with respect to an inter-vehicle distance which will become zero at deceleration (a low rate of 0.06 G) with an aid of OD (Over-Drive) release of the transmission 18 through the transmission controller 19 before an interval to a preceding vehicle becomes 18$m$.

Subsequently, in step 329, it is confirmed whether the constant inter-vehicle distance control should be maintained. If a NO answer is obtained, the routine then proceeds to step 330.

Figure 6:
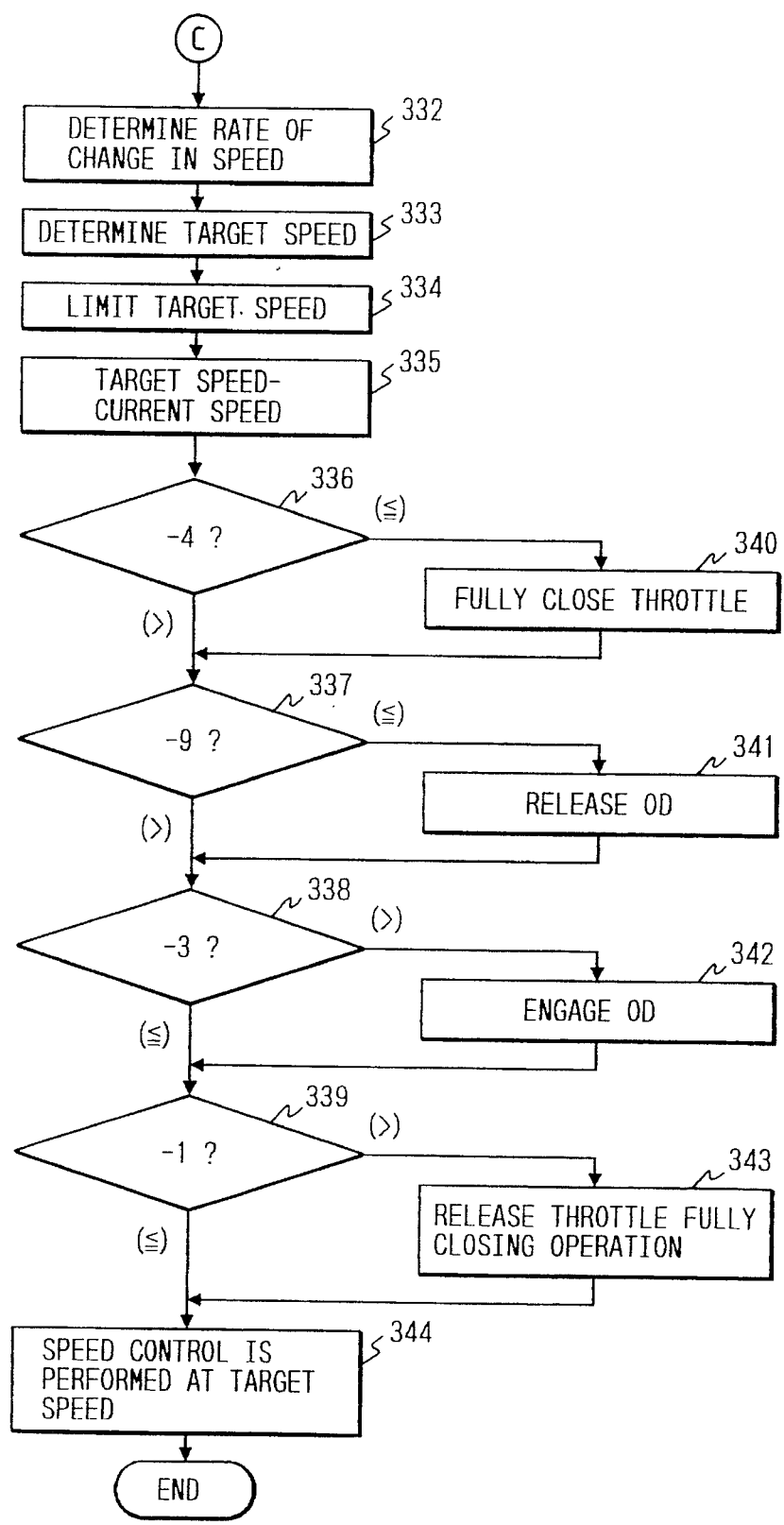

The operation of the constant inter-vehicle distance control at a target inter-vehicle distance selected by the driver carried out after steps 329 and 323, as referred to in FIG. 4, will be discussed below with reference to FIG. 6.

Figure 11:
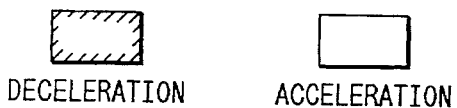
FIG. 11 is a map for determining a rate of change in speed of a controlled vehicle required for the controlled vehicle to track a preceding vehicle.

In step 332, a rate of change in vehicle speed (i.e., acceleration or deceleration) is calculated based on a difference between the target inter-vehicle distance stored in the buffer and an actual inter-vehicle distance currently detected. In practice, the rate of change in vehicle speed is determined using a two-dimensional map, as shown in FIG. 11. This map shows given acceleration/deceleration values which are defined by a relation between a value derived by subtracting a target inter-vehicle distance from a current inter-vehicle distance and a relative speed to a preceding vehicle.

The mapped acceleration/deceleration values are so selected as to perform fine inter-vehicle distance control under different traveling conditions. For example, the system vehicle is prevented from being decelerated undesirably when although an inter-vehicle distance to a preceding vehicle is small, the preceding vehicle is moving away from the system vehicle. In addition, when although the system vehicle has a sufficient inter-vehicle distance to the preceding vehicle, it is approaching the preceding vehicle at a higher relative speed, the system vehicle is made to be decelerated earlier.

After determining an appropriate acceleration/deceleration value in the above manner, the routine proceeds to step 333 wherein a target vehicle speed is determined using the following equation (1).

$$VM = VM + KVM \times DV \times dt \qquad (1)$$

where VM is a target vehicle speed (km/h), DV is the rate of change, in vehicle speed (km/h/sec) (i.e., an acceleration/deceleration value, as derived in step 332), KVM is 3 when VM–VN and DV show the same sign or 1 when they show a different sign, VN denotes a current vehicle speed, and dt represents a control cycle (e.g., 50 msec). The provision of KVM serves to improve a response rate of vehicle speed control from acceleration to deceleration, and vice versa.

After step 333, the routine proceeds to step 334 wherein the target vehicle speed calculated in step 333 is limited for preventing it from greatly exceeding the current vehicle speed. For example, the target vehicle speed is checked whether it meets the condition of (VN–10 km/h)<VM<(VN+3.5 km/h). If this condition is met, the target vehicle speed is modified to satisfy that condition. This prevents the control mode determining section 28 from selecting an abrupt acceleration or deceleration operation.

Additionally, in step 334, the vehicle speed limit-setting section 153 checks whether the target vehicle speed is less than a speed limit (i.e., a maximum allowable speed) selected by the driver. If more than the speed limit, the target vehicle speed is modified to less than the speed limit.

Subsequently, the routine proceeds to step 335 wherein a speed difference between the target vehicle speed and a current vehicle speed is calculated. In the following steps 336 to 339, the speed difference derived in step 335 is compared with –4, –9, –3, and–1 (km/h), respectively.

If, in step 336 it is concluded that the speed difference determined in step 335 is greater than –4 (km/h), the routine then proceeds to step 340 wherein the throttle valve is fully closed. If, in step 337, it is concluded that the speed difference determined in step 335 is greater than –9 (km/h), the routine then proceeds to step 341 wherein the OD of the transmission 18 is released. If, in step 338, it is concluded that the speed difference determined in step 335 is smaller than –3 (km/h), the routine then proceeds to step 34.2 wherein the OD of the transmission 18 is engaged again. In addition, if, in step 339, it is concluded that the speed difference determined in step 335 is smaller than –1 (km/h), the routine then proceeds to step 343 wherein the throttle valve-fully closing operation is released.

Figure 12:
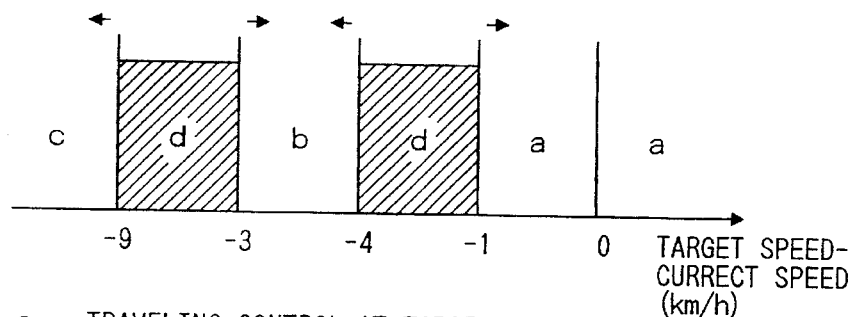
FIG. 12 is a graph which shows control modes of a vehicle speed control system.

Steps 335 to 339 show an operation of the control mode-determining section 28 selected using a map, as shown in FIG. 12, respectively. In this map, the abscissa axis shows the speed difference between the target vehicle speed and the current vehicle speed, as determined in step 335. In this example, when the target vehicle speed is smaller than the current vehicle speed by more than 4 km/h, the throttle valve is fully closed. When the target vehicle speed is smaller than the current vehicle speed by more than 9 km/h, the OD of the transmission 18 is released to provide a downshift to a higher gear ratio. These operations are released when the current vehicle speed becomes smaller than the target vehicle speed to less than 1 km/h and 3 km/h, respectively. The provision of such as a hysteresis eliminates the discontinuity of control.

The operation of the control mode-determining section 28, as discussed above, is able to automatically detect a condition wherein although the system vehicle decelerates, the speed difference from the target vehicle speed becomes greater, for example when the system vehicle is descending a slope for controlling the transmission 18 to select a higher gear ratio, providing a higher deceleration rate.

In the vehicle speed control system of the invention, the driver sets, as already mentioned, a target inter-vehicle distance to a preceding vehicle after being identified by the system. This makes it possible to have the preceding vehicle identified by the system coincide with a vehicle visually perceived by the driver with a high accuracy. Additionally, in the event that a preceding vehicle tracked at the target inter-vehicle distance selected by the driver has disappeared caused by veering to another lane or interruption of another vehicle ahead of the system vehicle, the constant inter-vehicle distance control is terminated, the throttle valve is fully closed, and the system vehicle is brought under a manual operation of the driver.

Further, the above described operation of trailing a preceding vehicle visually identified by the driver may establish substantially the same driving pattern as produced by a manual driving operation of the driver. This prevents a time lag in an accident avoiding operation which may be caused by the driver's dependency on the system.

The vehicle speed control system, as mentioned above, is so designed as to switch between the constant inter-vehicle distance mode and the cruise control mode. It should be noted, however that the present invention is not limited to same, and that it is applicable to a system performing the constant inter-vehicle distance control only.

Figure 13:
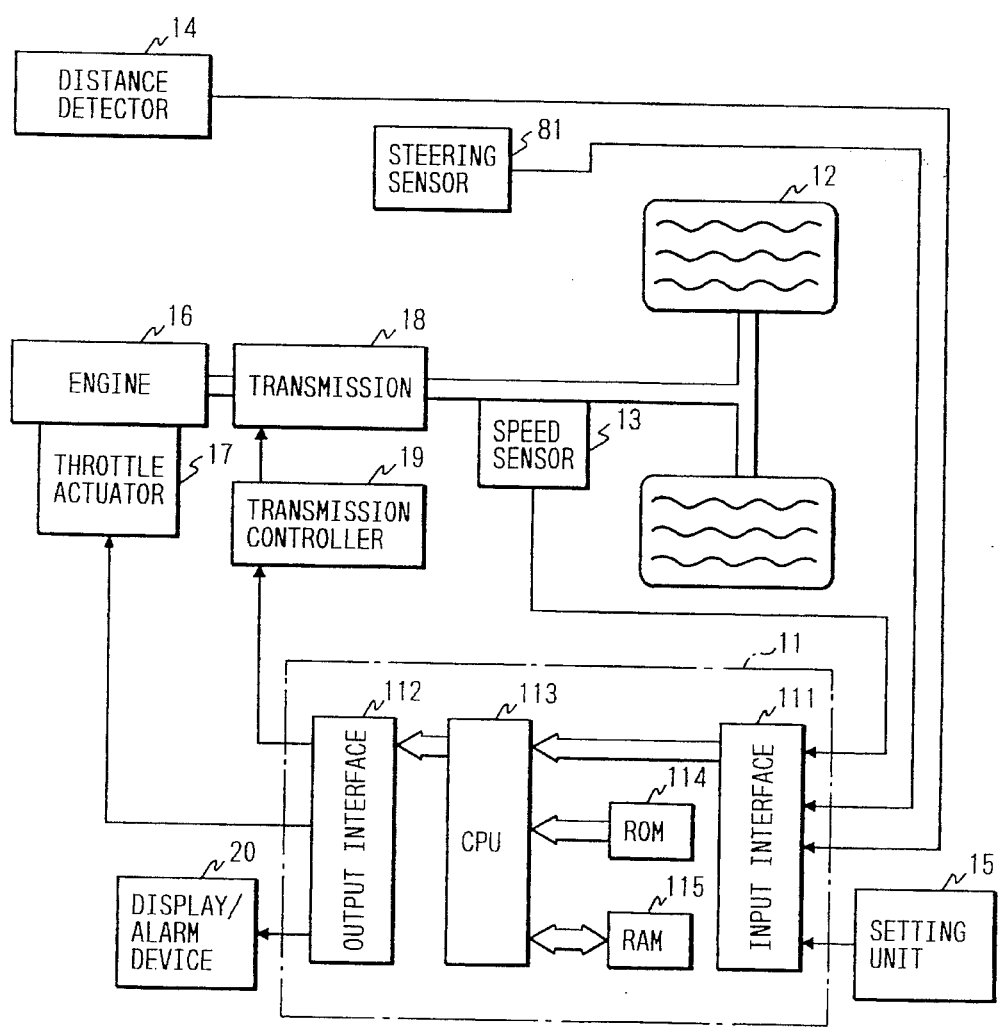
FIG. 13 is a block diagram which shows a second embodiment of a vehicle speed control system according to the present invention.

Referring to FIG. 13, there is shown an alternative embodiment of the vehicle speed control system according to the present invention. This embodiment is different from the above first embodiment in that a steering sensor 81 is provided to monitor a steered angle of the wheels, and provides a signal indicative thereof to the control unit 11. In addition, the inter-vehicle distance detector 14 is provided with an optical radar unit designed to emit a plurality of electromagnetic waves in forward different directions to receive, a reflected wave from an object present in a forward detecting range for monitoring an angular direction and an interval to the object. For example, U.S. application Ser. Nos. 08/162,276, filed on Dec. 7, 1993 and 08/118,235, filed on Sep. 9, 1993, teach such a type of radar unit for use in an anti-collision system, the contents of which are herein incorporated by reference.

Figure 14:
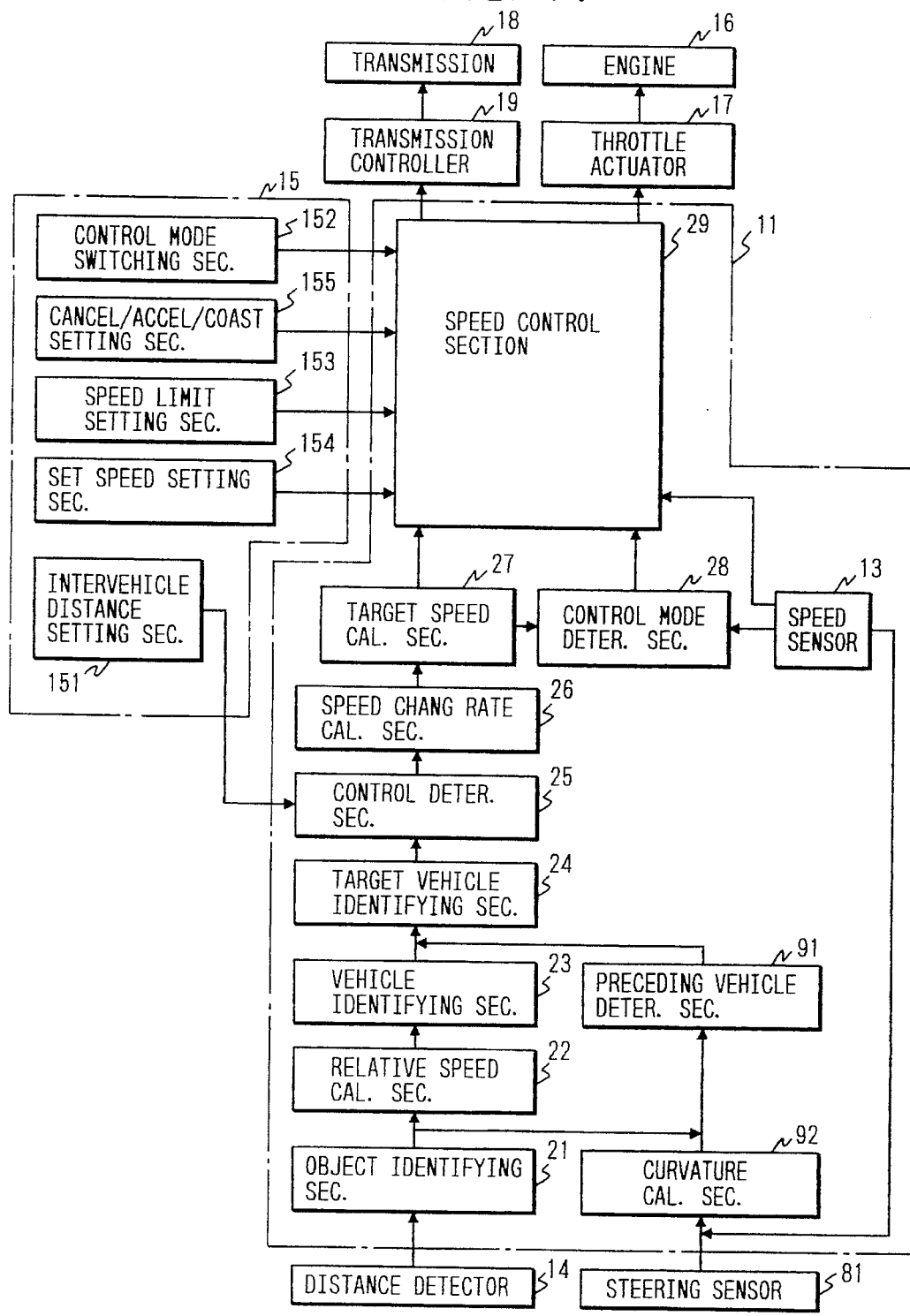
FIG. 14 is a block diagram which shows a speed control section of a second embodiment of a vehicle speed control system.

Referring to FIG. 14, the control unit 11 includes a curvature determining section 92 and a preceding vehicle probability determining section 91. The curvature determining section 92 is responsive to sensor signals from the steering sensor 81 and the vehicle speed sensor 13 to determine the curvature or the radius of curvature of a road on which the system vehicle is traveling based on a steered angle and a vehicle speed using a given formula. Other arrangements are the same as those of the above first embodiment and explanation thereof in detail will be omitted here.

The preceding vehicle probability determining section YI calculates, based on the radius of curvature determined by the curvature determining section 92, an angular direction, and an interval to an object detected by the inter-vehicle distance detector 14, an inter-vehicle distance probability indicative of the degree to which the object detected exists on the same lane as the system vehicle, and provides a signal indicative thereof to the target vehicle-identifying section 24.

An operation of the second embodiment will be discussed hereinbelow with reference to flowcharts. Most of a program is substantially the same as those of the first embodiment, therefore, only different logical steps will be explained.

Figure 15:
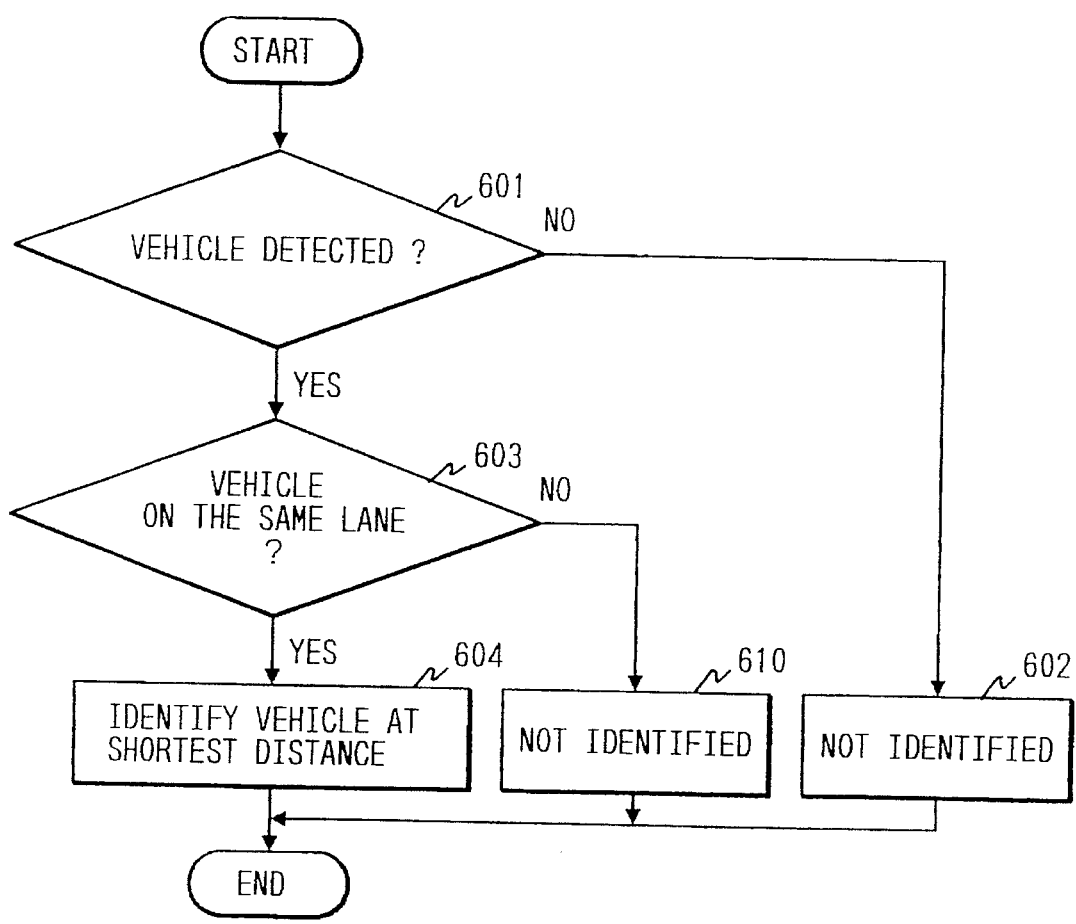
FIGS. 15 and 16 are flowcharts which show logical steps performed by a speed control unit of a second embodiment.

FIG. 15 shows logical steps for identifying a preceding vehicle to be tracked which are to be performed in step 313, as shown in FIG. 3.

Initially, in step 601, it is determined whether there is an preceding vehicle currently detected. If a NO answer is obtained, the routine then proceeds to step 602 wherein information that a vehicle to be tracked cannot be identified is stored and reported to the driver. Alternatively, if a YES answer is obtained, the routine then proceeds to step 603 wherein it is determined whether the currently detected preceding vehicle is traveling on the same lane as the system vehicle. This is accomplished by determining the inter-vehicle distance probability.

If it is confirmed that the detected preceding vehicle is traveling on the same lane, the routine then proceeds to step 604 wherein, when a plurality of vehicles are detected on the same lane, one having the shortest inter-vehicle distance is identified as a vehicle to be tracked. Alternatively, if it is concluded that there is no vehicle present on the same lane in step 603, the routine then proceeds to step 610 wherein information that a vehicle to be tracked cannot be identified is stored and reported to the driver.

Figure 16:
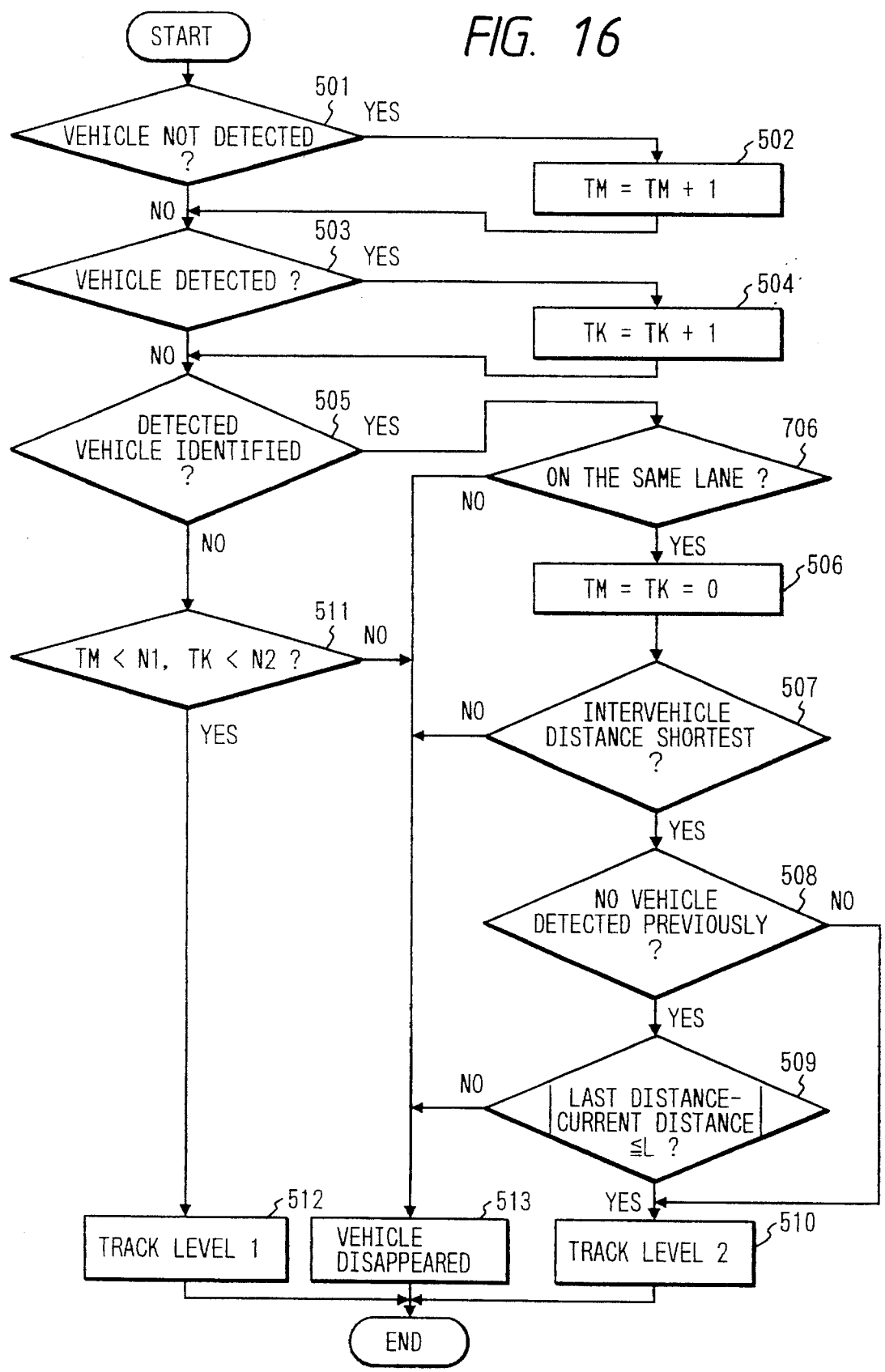

FIG. 16 shows logical steps, for determining if a preceding vehicle being tracked has disappeared, which are performed in step 314, as shown in FIG. 3. These logical steps are different from those in FIG. 8 only in that step 706 is added before step 507, therefore, explanation of other steps will be omitted here.

If a YES answer is obtained in step 505 meaning that a preceding vehicle detected has been identified as a vehicle to be tracked, the routine then proceeds to step 706 wherein it is further determined whether the identified preceding vehicle is moving on the same lane as the system vehicle. If a YES answer is obtained, the routine then proceeds to step 507 similar to the first embodiment. Alternatively, if a NO answer is obtained, the routine then proceeds to step 513 wherein information that the preceding vehicle tracked in the previous control cycle has disappeared, is given to the driver through the display/alarm device 20.

Accordingly, with the above mentioned second embodiment, the probability of identifying a preceding vehicle to be tracked during cornering is improved greatly.

A third embodiment of the vehicle speed control system of the invention will be discussed below with reference to FIGS. 17 and 18.

This embodiment does not utilize the steering sensor 81. The inter-vehicle distance detector 14 is, as different from the above embodiment, designed to radiate three electromagnetic waves in left, frontal, and right directions to have left, central, and right detection areas. The central detection area is so defined that a reflected wave returning therefrom shows a higher probability that a preceding vehicle being detected is traveling on the same lane than those in the left and right detection areas.

Figure 17:
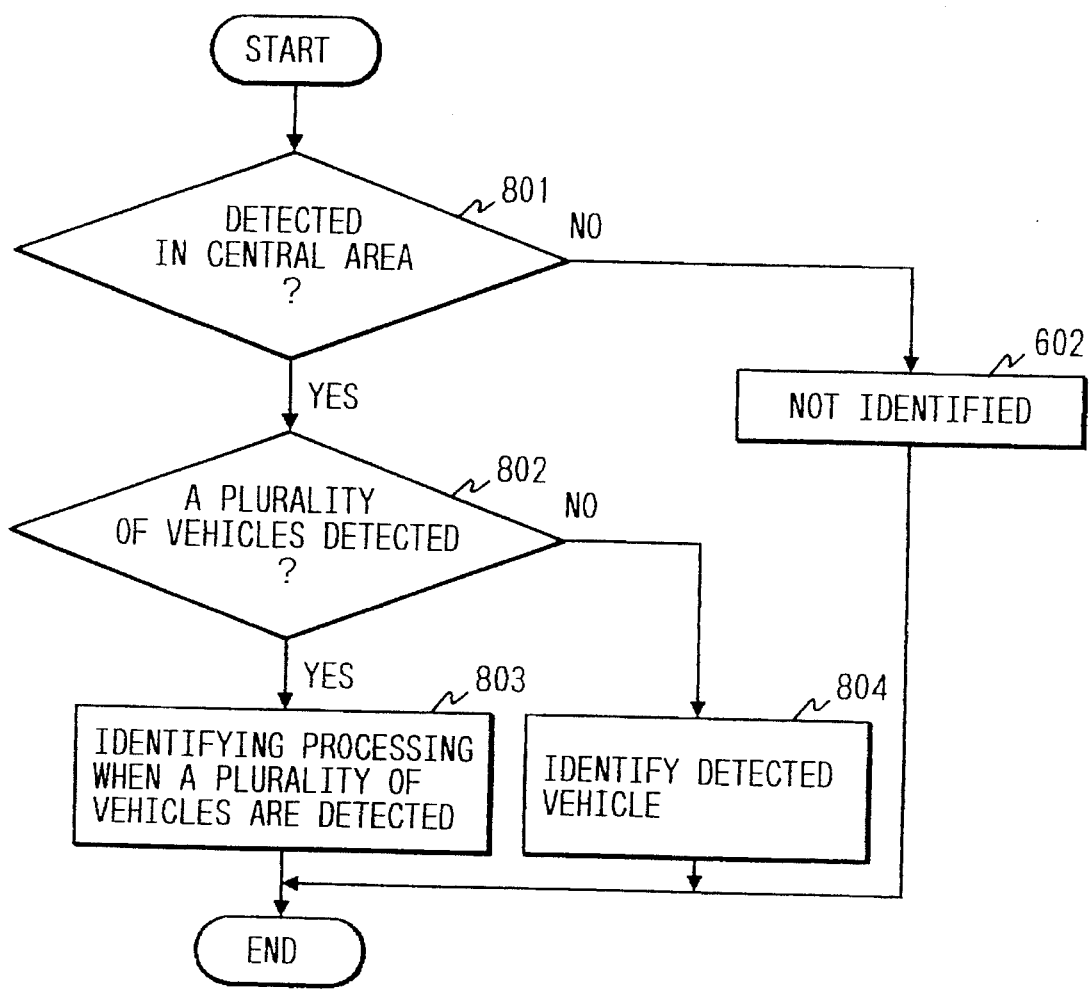
FIGS. 17 and 18 are flowcharts which show logical steps performed by a speed control unit of a third embodiment.

FIG. 17 shows logical steps for identifying a preceding vehicle to be tracked which are performed in step 313, as shown in FIG. 3.

Initially, in step 801, it is determined whether a preceding vehicle is detected in the central detection area of the inter-vehicle distance detector 14.

If a NO answer is obtained, the routine then proceeds to step 602 wherein information that a vehicle to be tracked cannot be identified, is stored and reported to the driver. Alternatively, if a YES answer is obtained, the routine then proceeds to step 802 wherein it is determined whether a plurality of preceding vehicles are detected. If only one vehicle is detected, the routine then proceeds to step 804 wherein the preceding vehicle being detected is identified as a vehicle to be tracked.

Alternatively, if a YES answer is obtained in step 802, the routine then proceeds to step 803 wherein one of the plurality of vehicles detected, as traveling on the same lane, having the shortest inter-vehicle distance is identified as a vehicle to be tracked. However, when more than two vehicles are moving at the same inter-vehicle distance, the system determines that a vehicle to be tracked cannot be identified.

Figure 18:
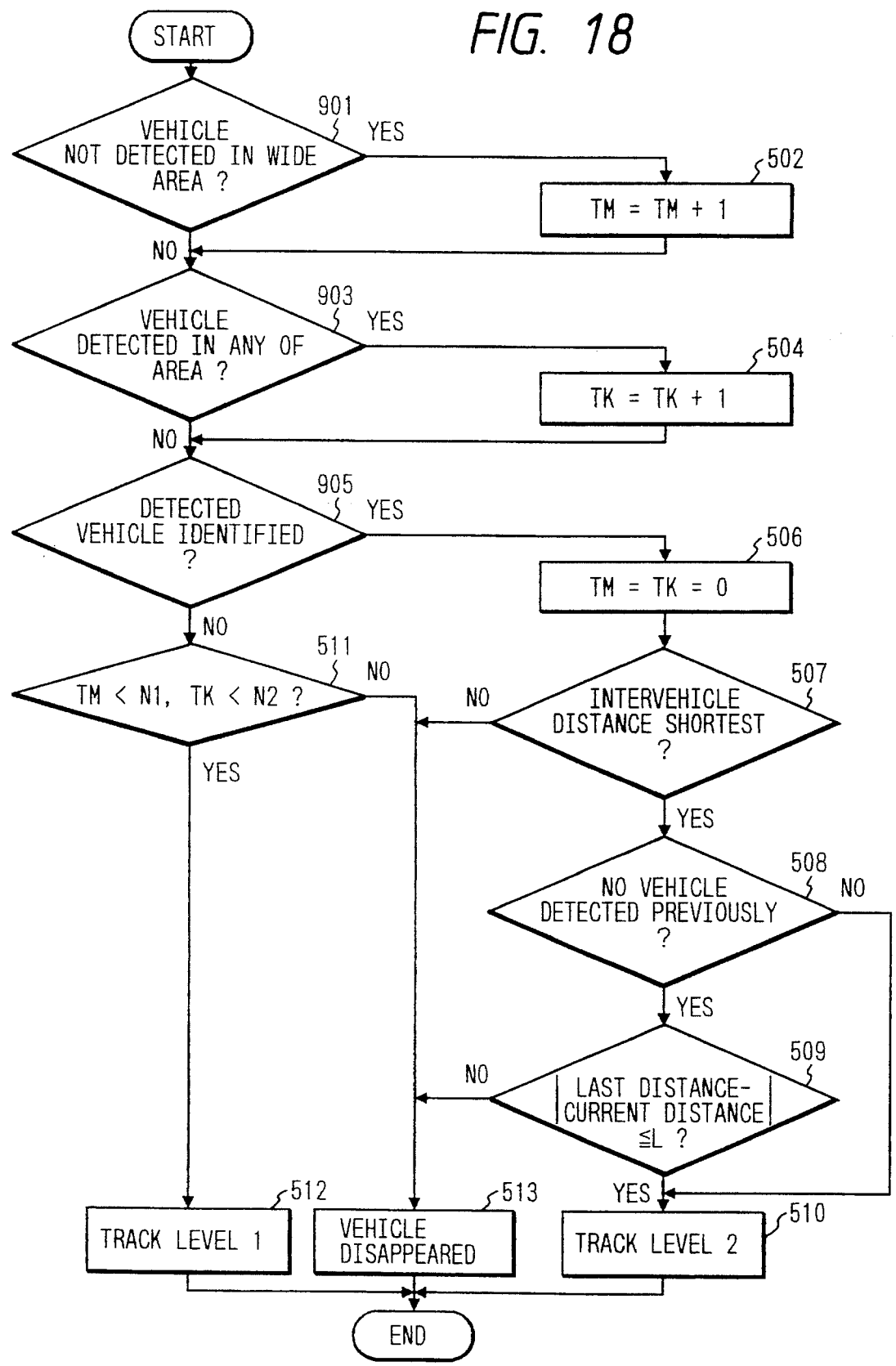

FIG. 18 shows logical steps for determining if a preceding vehicle tracked has disappeared which are performed in step 314, as shown in FIG. 3. Only differences from the flowchart of the above first embodiment, as shown in FIG. 8, will be discussed below.

In step 901, if no vehicle is detected in any of the detection areas, the routine then proceeds to step 502 wherein the timer value TM is incremented for measuring the length of time a vehicle is not detected anywhere in the left, central, and right detection areas.

In step 903, it is confirmed whether a preceding vehicle is detected in any of the detection areas. If YES answer is obtained, the routine then proceeds to step 504 wherein the timer value TK is incremented for measuring the length of time the preceding vehicle is detected in any of the detection areas.

Subsequently, if a YES answer is obtained in step 905 meaning that the preceding vehicle detected has been identified as a vehicle to be tracked, the routine then proceeds to step 506 wherein the timer values TM and TK are reset to zero. The routine then proceeds to step 507 wherein, when a plurality of preceding vehicles are detected, it is determined whether an inter-vehicle distance to the identified preceding vehicle is smallest.

If in step 507, it is concluded that the inter-vehicle distance to the identified preceding vehicle is not smallest, the routine then proceeds to step 513 wherein the system determines that the preceding vehicle tracked in the previous control cycle has disappeared. Alternatively, if it is concluded that the inter-vehicle distance to the identified preceding vehicle is smallest, the routine then proceeds to step 508 wherein it is determined whether a condition where a preceding vehicle cannot be identified exists in a previous control cycle. If a NO answer is obtained, the routine then proceeds to step 510 wherein information that the system vehicle is trailing the preceding vehicle at level 2, is stored and reported to the driver. Alternatively, if a YES answer is obtained concluding that a preceding vehicle was not detected in the previous control cycle, the routine then proceeds to step 509 wherein an inter-vehicle distance to a preceding vehicle last identified is compared with an inter-vehicle distance to the preceding vehicle currently identified to determine whether an absolute value of a difference in inter-vehicle distance is smaller than or equal to the preselected threshold value L. If a NO answer is obtained meaning that the absolute value of the difference in inter-vehicle distance is greater than the threshold value L, the routine then proceeds to step 513. Alternatively, if a YES answer is obtained, the routine then proceeds to step 510.

Additionally, if in step 905, a NO answer is obtained concluding that a preceding vehicle to be identified is not yet detected in any of the detection areas, the routine then proceeds to step 511 wherein the timer values TM and TK are compared with predetermined values N1 and N2. If both the timer values TM and TK are smaller than the values N1 and N2, respectively (TM<N1 and TK<N2), the routine then proceeds to step 512 wherein information that the system vehicle is trailing a preceding vehicle at level 1, is stored and reported to the driver. Alternatively, if a NO answer is obtained in step 511, the routine then proceeds to step 513 wherein the condition wherein the identified preceding vehicle has disappeared is stored and reported to the driver.

A fourth embodiment of the vehicle speed control system of the invention will be discussed below with reference to FIGS. 19 and 20.

This embodiment is a modification of the above third embodiment, and includes the inter-vehicle distance detector 14 which is designed to emit two types of electromagnetic waves for providing a wide detection area and a reduced detection area overlapping with the central portion of the wide detection area and receive reflected waves of the waves transmitted therefrom through the same sensitive element or different sensitive elements. For example, a millimeter wave may be used for providing the wide detection area, while a laser beam may be used for the reduced detection area.

This embodiment does not use the steering sensor 81, as shown in FIG. 14. However, when it is used, the logical steps for detecting a preceding vehicle, as discussed in the second embodiment, may be performed in addition to those, as described hereinbelow.

Figure 19:
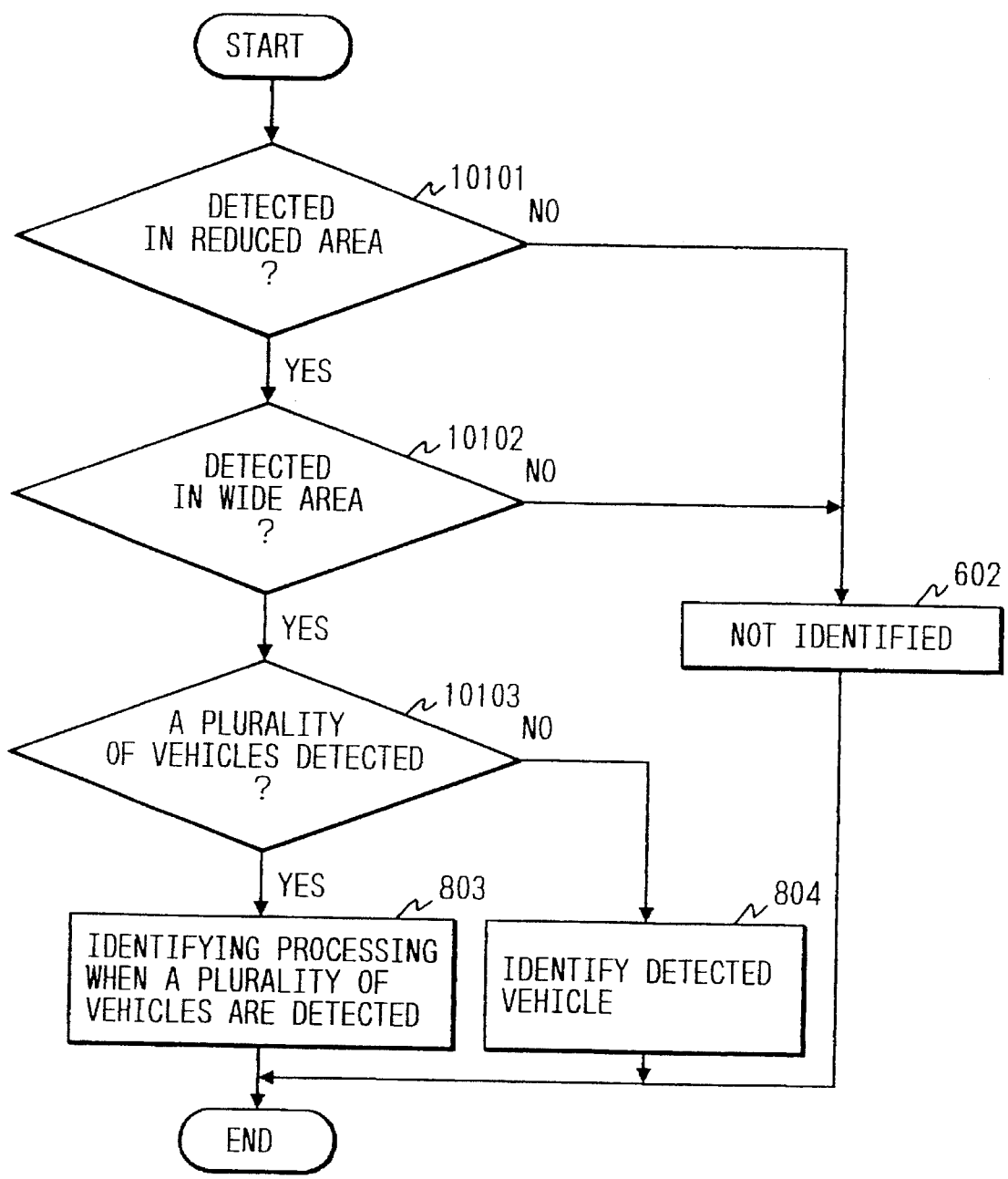
FIGS. 19 and 20 are flowcharts which show logical steps performed by a speed control unit of a fourth embodiment.

FIG. 19 shows logical steps for identifying a preceding vehicle to be tracked, which are performed in step 313, as shown in FIG. 3.

Initially, in step 10101, it is determined whether a preceding vehicle is detected in the reduced detection area of the inter-vehicle distance detector 14.

If a NO answer is obtained, the routine then proceeds to step, 602 wherein the system concludes that a vehicle to be tracked cannot be identified and reports it to-the driver. Alternatively, if a YES answer is obtained meaning that a preceding vehicle is detected in the reduced detection area, the routine then proceeds to step 10102 wherein it is determined whether the same preceding vehicle is detected in the wide detection area. This determination is accomplished by comparing an inter-vehicle distance and a relative speed to the preceding vehicle detected in the reduced detection area with those to the preceding vehicle detected in the wide detection area. If a NO answer is obtained concluding that the same vehicle is not detected in the wide detection area, the routine then proceeds to step 602. Alternatively, if a YES answer is obtained in step 10102, the routine then proceeds to step 10103 wherein it is determined whether a plurality of vehicles are detected. If only one vehicle is detected in both detection areas, the routine then proceeds to step 804 wherein that vehicle is identified as a vehicle to be tracked. In this step, when it is found that any object exists closer than the identified vehicle, the contents of step 804 may not be stored in the buffer.

Alternatively, if a YES answer is obtained in step 10103, the routine then proceeds to step 803 wherein one of the plurality of vehicles detected, as traveling on the same lane, having the shortest inter-vehicle distance is identified as a vehicle to be tracked. However, when more than two vehicles are moving at substantially the same inter-vehicle distance, the system determines that a vehicle to be tracked cannot be identified.

Figure 20:
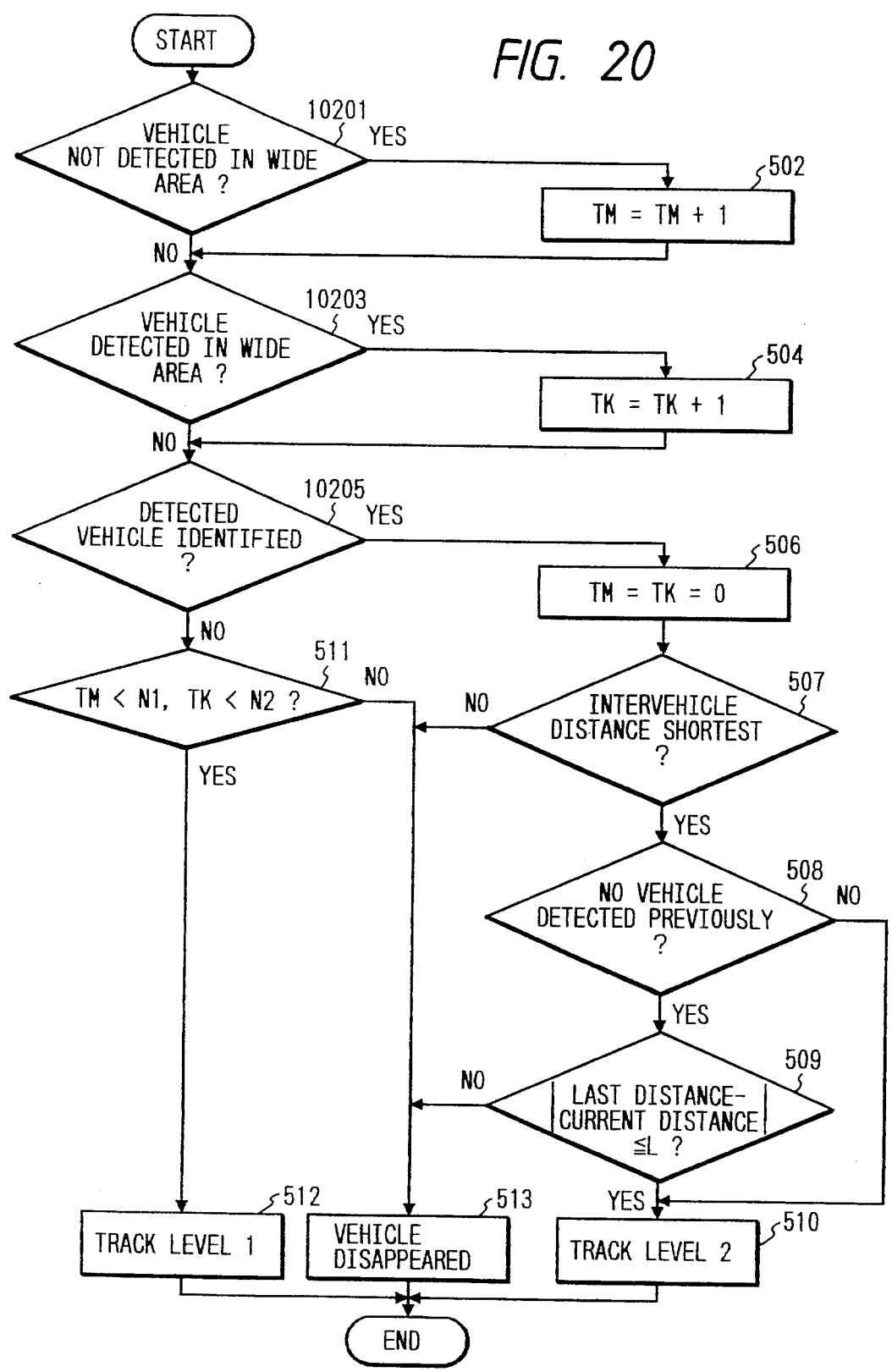

FIG. 20 shows logical steps for determining if a preceding vehicle tracked in a previous control cycle has disappeared, which are performed in step 314, as shown in FIG. 3. The differences from the flowchart, as shown in FIG. 8, in the above first embodiment will be discussed below.

In step 10201, if no vehicle is detected in the wide detection area, in other words, a preceding vehicle identified in a previous control cycle has moved out of the wide detection area, the routine then proceeds to step 502 wherein the timer value TM is incremented for measuring the length of time a vehicle to be tracked is not detected anywhere in the wide and reduced detection areas.

In step 10203, it is confirmed whether a preceding vehicle to be identified is detected in the wide detection range. If YES answer is obtained, the routine then proceeds to step 504 wherein the timer value TK is incremented for measuring the length of time the preceding vehicle is detected in the wide detection area.

Subsequently, if a YES answer is obtained in step 10205 meaning that the preceding vehicle detected in the wide detection area has been identified as a vehicle to be tracked, the routine then proceeds to step 506 wherein the timer values TM and TK are reset to zero. The routine then proceeds to step 507 wherein, when a plurality of preceding vehicles are detected, it is determined whether an inter-vehicle distance to the identified preceding vehicle is smallest.

If in step 507, it is concluded that the inter-vehicle distance to the identified preceding vehicle is not smallest, the routine then proceeds to step 513 wherein the system determines that the preceding vehicle tracked in the previous control cycle has disappeared. Alternatively, if it is concluded that the inter-vehicle distance to the identified preceding vehicle is smallest, the routine then proceeds to step 508 wherein it is determined whether a condition where a preceding vehicle cannot be identified exists in a previous control cycle. If a NO answer is obtained, the routine then proceeds to step 510 wherein information that the system vehicle is trailing the preceding vehicle at level 2, is stored and reported to the driver. Alternatively, if a YES answer is obtained concluding that a preceding vehicle was not detected in the previous control cycle, the routine then proceeds to step 509 wherein an inter-vehicle distance to a preceding vehicle last identified is compared with an inter-vehicle distance to the preceding vehicle currently identified to determine whether an absolute value of a difference in inter-vehicle distance is smaller than or equal to the preselected threshold value L. If a NO answer is obtained meaning that the absolute value of the difference in inter-vehicle distance is greater than the threshold value L, the routine then proceeds to step 513. Alternatively, if a YES answer is obtained, the routine then proceeds to step 510.

Additionally, if in step 10205, a NO answer is obtained concluding that a preceding vehicle to be identified is not yet detected in the wide detection area, the routine then proceeds to step 511 wherein the timer values TM and TK are compared with predetermined values N1 and N2. If both the timer values TM and TK is smaller than the values N1 and N2, respectively (TM<N1 and TK<N2), the routine then proceeds to step 512 wherein information that the system vehicle is trailing a preceding vehicle at level 1, is stored and reported to the driver. Alternatively, if a NO answer is obtained in step 511, the routine then proceeds to step 513 wherein the condition wherein the identified preceding vehicle has disappeared is stored and reported to the driver.

A fifth embodiment of the vehicle speed control system of the invention will be discussed below with reference to FIGS. 21 and 22.

This embodiment is a modification of the above third and fourth embodiments. The inter-vehicle distance detector 14 is of a stereo type distance detector having a CCD camera designed to measure distance to a preceding vehicle by analyzing a frontal image using the triangulation. This inter-vehicle distance detector 14 provides a signal indicative of an interval to a detected object and its appearance (vehicle body characteristics) to the control unit 11.

This embodiment does not use the steering sensor 81, as shown in FIG. 14. However, it may alternatively be used. When the steering sensor 81 is employed, the logical steps for detecting a preceding vehicle, as discussed in the second embodiment may be performed in addition to those, as will be described hereinbelow.

Figure 21:
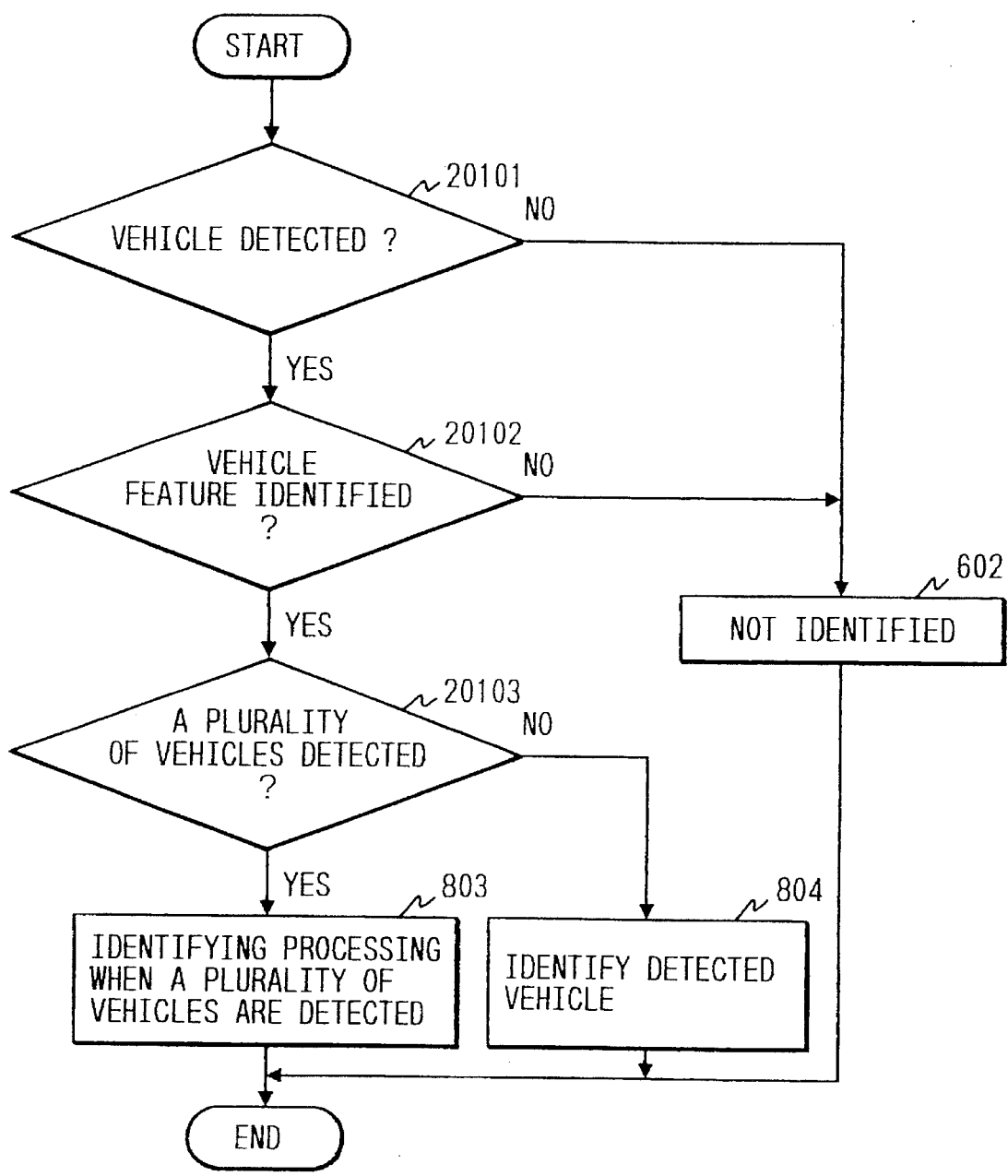
FIGS. 21 and 22 are flowcharts which show logical steps performed by a speed control unit of a fifth embodiment.

FIG. 21 shows logical steps for identifying a preceding vehicle to be tracked which are performed in step 313, as shown in FIG. 3.

Initially, in step 20101, it is determined whether a preceding vehicle is detected in a front detection area of the inter-vehicle distance detector 14.

If a NO answer is obtained, the routine then proceeds to step 602 wherein the system concludes that a vehicle to be tracked cannot be identified and reports it to the driver. Alternatively, if a YES answer is obtained in step 20101, the routine then proceeds to step 10102 wherein image data is analyzed to determine whether the preceding vehicle detected can be identified as a vehicle to be tracked or not. If a YES answer is obtained, the routine then proceeds to step 20103 wherein it is determined whether a plurality of vehicles are detected or not. If only one vehicle is detected, the routine then proceeds to step 804 wherein the vehicle currently detected is identified as a vehicle to be tracked. In this step, when it is found that any object exists closer than the identified vehicle, the contents of step 804 may not be stored in the buffer.

Alternatively, if a YES answer is obtained in step 20103, the routine then proceeds to step 803 wherein one of the plurality of vehicles detected, as traveling on the same lane, having the shortest inter-vehicle distance is identified as a vehicle to be tracked. However, when more than two vehicles are moving at substantially the same inter-vehicle distance, the system determines mat a vehicle to be tracked cannot be identified.

Figure 22:
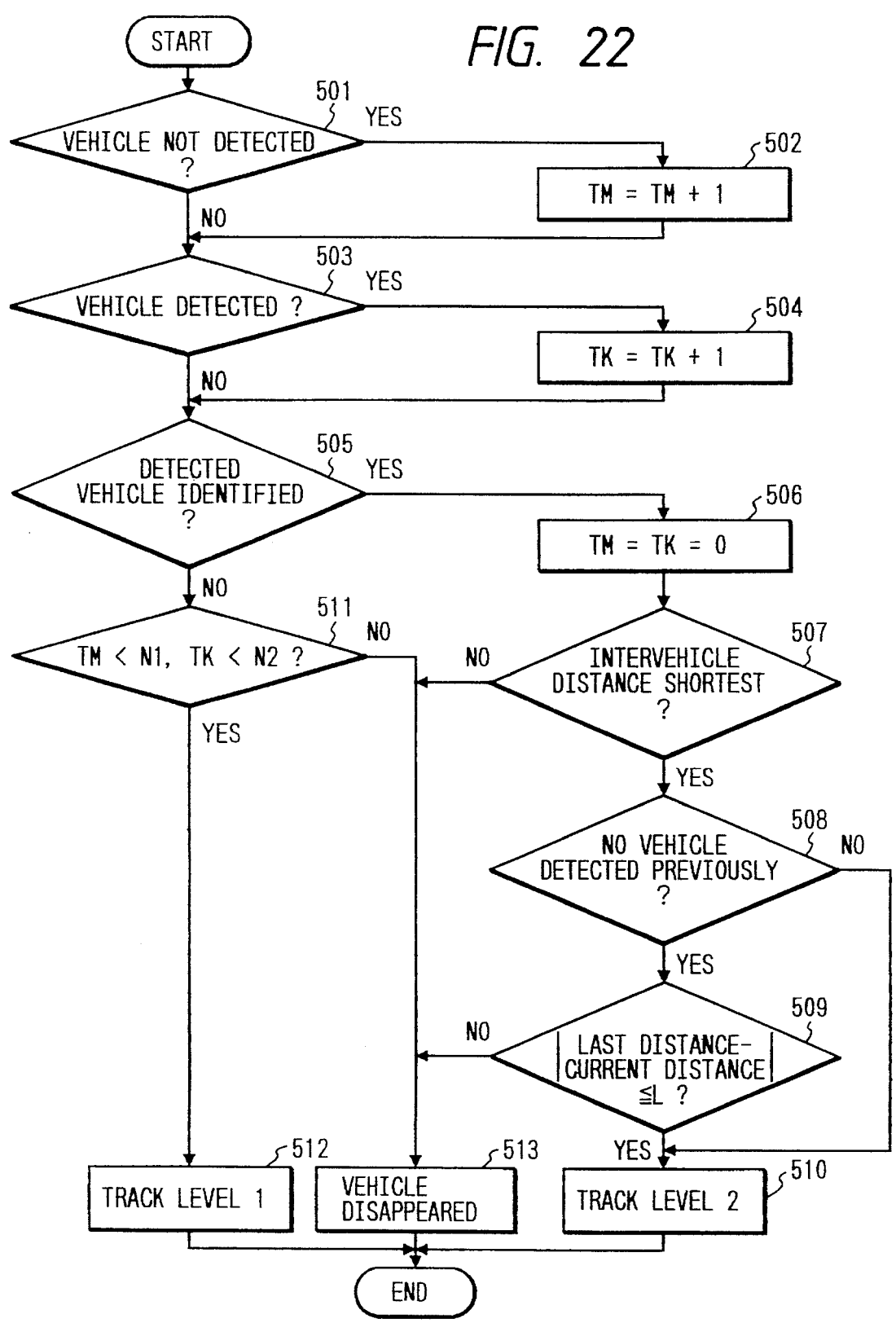

FIG. 22 shows logical steps for determining if a preceding vehicle tracked in a previous control cycle has disappeared, which are performed in step 314, as shown in FIG. 3.

In step 501, if no vehicle is detected using the frontal image data, the routine then proceeds to step 502 wherein the timer value TM is incremented for measuring the length of time a vehicle to be tracked is not detected using the frontal image data.

In step 503, it is confirmed whether a preceding vehicle to be identified is detected or not. If YES answer is obtained, the routine then proceeds to step 504 wherein the timer value TK is incremented for measuring the length of time the preceding vehicle is detracted by the inter-vehicle distance detector 14.

Subsequently, if a YES answer is obtained in step 505 meaning that the preceding vehicle detected has been identified as a vehicle to be tracked, the routine then proceeds to step 506 wherein the time values TM and TK are reset to zero. The routine then proceeds to step 507 wherein, when a plurality of preceding vehicles are detected, it is determined whether an inter-vehicle distance to the identified preceding vehicle is smallest.

If in step 507, it is concluded that the inter-vehicle distance to the identified preceding vehicle is not smallest, the routine then proceeds to step 513 wherein the system determines that the preceding vehicle tracked in the previous control cycle has disappeared. Alternatively, if it is concluded that the inter-vehicle distance to the identified preceding vehicle is smallest, the routine then proceeds to step 508 wherein it is determined whether a condition where a preceding vehicle cannot be identified exists in the previous control cycle. If a NO answer is obtained, the routine then proceeds to step 510 wherein information that the system vehicle is trailing the preceding vehicle at level 2, is stored and reported to the driver. Alternatively, if a YES answer is obtained concluding that a preceding vehicle was not detected in the previous control cycle, the routine then proceeds to step 509 wherein an inter-vehicle distance to a preceding vehicle last identified is compared with an inter-vehicle distance to the preceding vehicle currently identified to determine whether an absolute value of a difference in inter-vehicle distance is smaller than or equal to the preselected threshold value L. If a NO answer is obtained meaning that the absolute value of the difference in inter-vehicle distance is greater than the threshold value L, the routine then proceeds to step 513. Alternatively, if a YES answer is obtained, the routine then proceeds to step 510.

Additionally, if in step 505, a NO answer is obtained concluding that a preceding vehicle to be identified is not yet detected by the inter-vehicle distance detector 14, the routine then proceeds to step 511 wherein the timer values TM and TK are compared with predetermined values N1 and N2. If both the timer values TM and TK are smaller than the values N1 and N2, respectively, the routine then proceeds to step 512 wherein information that the system vehicle is trailing a preceding vehicle at level 1, is stored and reported to the driver. Alternatively, if a NO answer is obtained in step 511, the routine then proceeds to step 513 wherein the condition wherein the identified preceding vehicle has disappeared is stored and reported to the driver.

With the above arrangement, the use of the CCD camera eliminates the influence of an electromagnetic wave to provide fine detection of a preceding vehicle.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for controlling vehicle speed comprising:
   preceding vehicle detecting means for detecting whether a preceding vehicle is present ahead of a controlled vehicle, and for providing a first signal indicative thereof;
   preceding vehicle identifying means, responsive to said first signal from said preceding vehicle detecting means, for identifying whether the preceding vehicle meets a preselected tracking condition allowing the controlled vehicle to track the preceding vehicle, and for providing a second signal indicative thereof;
   informing means, responsive to said second signal from said preceding vehicle identifying means, for providing a third signal to a driver which informs the driver that the preceding vehicle meets the preselected tracking condition;
   control initiating means, responsive to a manual operation of the driver after the driver is informed that the preceding vehicle meets the preselected tracking condition, for providing a control initiating signal;
   inter-vehicle distance controlling means for controlling the speed of the controlled vehicle, wherein said controlled vehicle tracks the preceding vehicle at a set constant interval therebetween;
   curvature determining means for determining a curvature of a curved road on which the controlled vehicle is traveling; and
   probability determining means for determining a probability that the preceding vehicle detected is present on the same traffic lane as the controlled vehicle during cornering on the curved road based on the curvature determined by the curvature determining means.

2. A system as set forth in claim 1, further comprising detected preceding vehicle identifying means for monitoring whether the preceding vehicle is being tracked and for providing a fourth signal indicative thereof, wherein when the preceding vehicle has moved out of a detection area of said preceding vehicle detecting means, said inter-vehicle distance controlling means is deactivated.

3. A system as set forth in claim 2, wherein a current vehicle speed is maintained for a preselected period of time after the preceding vehicle has moved out of the detection area of said preceding vehicle detecting means.

4. A system as set forth in claim 3, wherein the current vehicle speed is maintained for the preselected period of time when another vehicle squeezes between the preceding vehicle being tracked and the controlled vehicle within the detection area of said preceding vehicle detecting means.

5. A system as set forth in claim 2, wherein said preceding vehicle detecting means determines for each periodic control cycle of said system an interval and a relative speed between the controlled vehicle and the preceding vehicle, and wherein when a preceding vehicle was not detected in a control cycle immediately before a current control cycle, said detected preceding vehicle identifying means determines an interval difference between an interval to a last preceding vehicle identified in a last control cycle and an interval to a current preceding vehicle detected in the current control cycle, and when the interval difference is smaller than a preselected interval difference threshold value, said detected preceding vehicle identifying means considers said last preceding vehicle to exist in a front detection area of said preceding vehicle detecting means.

6. A system as set forth in claim 2, wherein when another vehicle squeezes between the preceding vehicle being tracked and the controlled vehicle within the detection area of said preceding vehicle detecting means, said inter-vehicle distance controlling means is deactivated.

7. A system as set forth in claim 1, wherein said preceding vehicle detecting means determines an interval and a relative speed between the controlled vehicle and the preceding vehicle, and wherein said preceding vehicle detecting means concludes that the preceding vehicle is detected when variations in the interval and the relative speed are smaller than first and second threshold values, respectively.

8. A system as set forth in claim 1, wherein said preceding vehicle detecting means determines an interval and a relative speed between the controlled vehicle and the preceding vehicle, and wherein said system further comprises an inter-vehicle distance setting switch responsive to the manual operation of the driver, for providing a fourth signal indicative of a current interval to the preceding vehicle, said control initiating means being responsive to said fourth signal to provide the control initiating signal.

9. A system as set forth in claim 8, wherein the preselected tracking condition is defined according to a relation between the interval and the relative speed between the controlled vehicle and the preceding vehicle.

10. A system as set forth in claim 1, wherein when a plurality of vehicles exist in a front detection area of said preceding vehicle detecting means, said preceding vehicle detecting means identifies one of the plurality of vehicles traveling at the shortest interval as the preceding vehicle.

11. A system as set forth in claim 1, wherein said preceding vehicle detecting means determines an interval and a relative speed between the controlled vehicle and the preceding vehicle, and wherein said inter-vehicle distance controlling means determines a target rate of change in speed of the controlled vehicle based on the relative speed and the interval between the controlled vehicle and the preceding vehicle, and a target interval to the preceding vehicle selected by the driver, said inter-vehicle distance controlling means also determining a target vehicle speed for maintaining the set constant interval to the preceding vehicle on the target rate of change in speed of the controlled vehicle.

12. A system as set forth in claim 11, wherein said inter-vehicle distance controlling means controls the speed of the controlled vehicle with the aid of at least one of modification of a throttle valve opening degree, control of a transmission, and control of a brake.

13. A system as set forth in claim 1, wherein said curvature determining means determines a radius of curvature of the curved road based on a steered angle of the controlled vehicle and a speed of the controlled vehicle.

14. A system as set forth in claim 1, said preceding vehicle detecting means further including a distance detector radiating a first electromagnetic wave in a left direction, a second electromagnetic wave in a frontal direction, and a third electromagnetic wave in a right direction.

15. A system as set forth in claim 14, wherein when said second wave is reflected from said frontal direction, said probability determining means indicates a higher probability that said preceding vehicle is present on the same traffic lane as the controlled vehicle, than when a first wave is reflected from said left direction or when a third wave is reflected from said right direction.

16. A system as set forth in claim 1, said preceding vehicle detecting means further including a distance detector radiating a first electromagnetic wave having a first radiation type and a second electromagnetic wave having a second radiation type, said first wave having a wider detection area than said second wave, said second wave overlapping said first wave in a central portion corresponding to a central direction.

17. A system as set forth in claim 1, said preceding vehicle detecting means further including a stereo-type distance detector having a CCD camera, wherein an interval between said controlled vehicle and said preceding vehicle is determined using triangulation according to an image provided by said CCD camera.

* * * * *